(12) United States Patent
Houkom et al.

(10) Patent No.: US 10,766,533 B2
(45) Date of Patent: Sep. 8, 2020

(54) UTILITY VEHICLE

(71) Applicant: Polaris Industries Inc., Medina, MN (US)

(72) Inventors: Austin L. Houkom, Hugo, MN (US);
Kyle J. Schounard, Osceola, WI (US);
David J. Hicke, Hugo, MN (US);
Shawn D. Peterson, East Bethel, MN (US); Travis J. Ellefson, Luck, WI (US)

(73) Assignee: Polaris Industries Inc., Medina, MN (US)

( * ) Notice: Subject to any disclaimer, the term of this patent is extended or adjusted under 35 U.S.C. 154(b) by 241 days.

(21) Appl. No.: 15/888,443

(22) Filed: Feb. 5, 2018

(65) Prior Publication Data
US 2018/0154941 A1    Jun. 7, 2018

Related U.S. Application Data

(63) Continuation of application No. 14/965,226, filed on Dec. 10, 2015, now Pat. No. 9,884,647.

(51) Int. Cl.
*B62D 21/02* (2006.01)
*B62D 21/11* (2006.01)
(Continued)

(52) U.S. Cl.
CPC .............. *B62D 21/02* (2013.01); *B60R 21/13* (2013.01); *B62D 21/11* (2013.01); *B62D 21/183* (2013.01)

(58) Field of Classification Search
CPC ........ B62D 21/02; B62D 21/11; B62D 21/13; B62D 21/183
See application file for complete search history.

(56) References Cited

U.S. PATENT DOCUMENTS

| 1,031,497 A | 7/1912 | West |
| D119,377 S | 3/1940 | Cadwallader |
(Continued)

FOREIGN PATENT DOCUMENTS

| CA | 2265693 A1 | 3/1998 |
| CH | 317335 A | 11/1956 |
(Continued)

OTHER PUBLICATIONS

Shock Owner's Manual: Float ATV + Snowmobile—Fox Racing Shox, copyright 2006; 18 pages.
(Continued)

*Primary Examiner* — James A English
(74) *Attorney, Agent, or Firm* — Faegre Drinker Biddle & Reath LLP

(57) ABSTRACT

A vehicle includes a plurality of ground-engaging members, a frame assembly supported by the plurality of ground-engaging members, and a seating area supported by the frame assembly and configured to support at least an operator and a passenger. The vehicle also includes a cargo area positioned rearward of the seating area and including a floor configured to support cargo thereon. Additionally, the vehicle includes a powertrain assembly including an engine and a transmission operably coupled to at least one of the plurality of ground-engaging members. A heat exchanger is fluidly coupled to the engine. The heat exchanger is angled relative to the floor of the cargo area and positioned along a lateral side of the cargo area.

28 Claims, 26 Drawing Sheets

(51) Int. Cl.
　　　*B62D 21/18*　　　(2006.01)
　　　*B60R 21/13*　　　(2006.01)

(56) References Cited

U.S. PATENT DOCUMENTS

| | | |
|---|---|---|
| 2,468,809 A | 5/1949 | Brock |
| 2,553,795 A | 5/1951 | Staude |
| 2,576,017 A | 11/1951 | John |
| 2,672,103 A | 3/1954 | Hohmes |
| 2,833,366 A | 5/1958 | Olley |
| 3,048,233 A | 8/1962 | Crain |
| 3,193,302 A | 7/1965 | Hill |
| 3,259,211 A | 7/1966 | Ryskamp |
| 3,336,074 A | 8/1967 | Barnes et al. |
| 3,603,422 A | 9/1971 | Cordiano |
| 3,712,416 A | 1/1973 | Swanson |
| 3,734,219 A | 5/1973 | Christensen |
| 3,791,482 A | 2/1974 | Sykora |
| 3,800,910 A | 4/1974 | Rose |
| 3,858,902 A | 1/1975 | Howells et al. |
| 3,861,229 A | 1/1975 | Domaas |
| 3,917,310 A | 11/1975 | Mitsuishi |
| D237,873 S | 12/1975 | Johnson |
| 3,966,014 A | 6/1976 | Gowing |
| 4,010,975 A | 3/1977 | Horton |
| 4,027,892 A | 6/1977 | Parks |
| 4,089,542 A | 5/1978 | Westerman |
| 4,098,414 A | 7/1978 | Abiera |
| 4,109,751 A | 8/1978 | Kabele |
| 4,114,713 A | 9/1978 | Mery |
| 4,136,756 A | 1/1979 | Kawamura |
| 4,217,970 A | 8/1980 | Chika |
| 4,254,746 A | 3/1981 | Chiba |
| 4,340,123 A | 7/1982 | Fujikawa |
| 4,340,124 A | 7/1982 | Leonard |
| 4,366,878 A | 1/1983 | Warf |
| 4,425,976 A | 1/1984 | Kimura |
| 4,434,755 A | 3/1984 | Kazuta |
| 4,561,323 A | 12/1985 | Stromberg |
| 4,577,716 A | 3/1986 | Norton |
| 4,592,316 A | 6/1986 | Shiratsuchi |
| 4,600,072 A | 7/1986 | Krude |
| 4,626,024 A | 12/1986 | Swann |
| 4,641,854 A | 2/1987 | Masuda |
| 4,671,521 A | 6/1987 | Talbot |
| 4,681,178 A | 7/1987 | Brown |
| 4,686,433 A | 8/1987 | Shimizu |
| 4,695,089 A | 9/1987 | Fukutomi et al. |
| 4,700,982 A | 10/1987 | Kuraoka et al. |
| 4,705,128 A | 11/1987 | Krude |
| 4,712,629 A | 12/1987 | Takahashi |
| 4,732,244 A | 3/1988 | Verkuylen |
| 4,821,825 A | 4/1989 | Somerton-Rayner |
| 4,934,737 A | 6/1990 | Nakatsuka |
| D312,441 S | 11/1990 | Guelfi |
| 4,974,697 A | 12/1990 | Krude |
| 5,010,970 A | 4/1991 | Yamamoto |
| 5,016,728 A | 5/1991 | Zulawski |
| 5,020,616 A | 6/1991 | Yagi |
| 5,021,721 A | 6/1991 | Oshita |
| 5,027,915 A | 7/1991 | Suzuki |
| 5,036,939 A | 8/1991 | Johnson |
| 5,038,582 A | 8/1991 | Takamatsu |
| 5,042,835 A | 8/1991 | Burns |
| 5,044,614 A | 9/1991 | Rau |
| 5,048,860 A | 9/1991 | Kanai |
| 5,076,383 A | 12/1991 | Inoue |
| 5,078,225 A | 1/1992 | Ohmura |
| 5,181,696 A | 1/1993 | Abe |
| 5,195,607 A | 3/1993 | Shimada |
| 5,203,585 A | 4/1993 | Pierce |
| 5,205,371 A | 4/1993 | Kamopp |
| 5,251,713 A | 10/1993 | Enokimoto |
| 5,251,718 A | 10/1993 | Inagawa |
| 5,253,730 A | 10/1993 | Hayashi |
| 5,327,989 A | 7/1994 | Furuhashi |
| D354,264 S | 1/1995 | McCoy |
| 5,393,194 A | 2/1995 | Smith |
| 5,473,990 A | 12/1995 | Anderson |
| 5,507,510 A | 4/1996 | Kami |
| D373,099 S | 8/1996 | Molzon |
| 5,573,300 A | 11/1996 | Simmons |
| 5,653,304 A | 8/1997 | Renfroe |
| 5,697,633 A | 12/1997 | Lee |
| D391,911 S | 3/1998 | Lagaay |
| 5,776,568 A | 7/1998 | Andress |
| 5,779,272 A | 7/1998 | Panek et al. |
| 5,819,702 A | 10/1998 | Mendler |
| 5,820,114 A | 10/1998 | Tsai |
| 5,842,732 A | 12/1998 | Daggett et al. |
| 5,863,277 A | 1/1999 | Melbourne |
| 5,887,671 A | 3/1999 | Yuki |
| 5,921,343 A | 7/1999 | Yamakaji |
| 5,950,750 A | 9/1999 | Dong et al. |
| 5,954,364 A | 9/1999 | Nechushtan |
| 5,957,252 A | 9/1999 | Berthold |
| D414,735 S | 10/1999 | Gerisch |
| 5,961,106 A | 10/1999 | Shaffer |
| 5,961,135 A | 10/1999 | Smock |
| 5,971,434 A | 10/1999 | Neufeld et al. |
| 6,029,750 A | 2/2000 | Carrier |
| D421,934 S | 3/2000 | Hunter |
| 6,056,077 A | 5/2000 | Kobayashi |
| 6,092,877 A | 7/2000 | Rasidescu et al. |
| 6,095,275 A | 8/2000 | Shaw |
| 6,098,739 A | 8/2000 | Anderson |
| 6,120,399 A | 9/2000 | Okeson |
| 6,126,227 A | 10/2000 | Bitelli |
| 6,142,123 A | 11/2000 | Galasso |
| 6,149,540 A | 11/2000 | Johnson et al. |
| D436,557 S | 1/2001 | Selby |
| 6,176,796 B1 | 1/2001 | Lislegard |
| 6,199,894 B1 | 3/2001 | Anderson |
| 6,202,993 B1 | 3/2001 | Wilms |
| 6,216,809 B1 | 4/2001 | Etou |
| 6,224,046 B1 | 5/2001 | Miyamoto |
| 6,247,442 B1 | 6/2001 | Bedard |
| 6,293,605 B2 | 9/2001 | Neubrand |
| D459,133 S | 6/2002 | Shiflet |
| 6,412,585 B1 | 7/2002 | DeAnda |
| 6,416,108 B1 | 7/2002 | Elswick |
| D461,151 S | 8/2002 | Morris |
| 6,467,787 B1 | 10/2002 | Marsh |
| D467,200 S | 12/2002 | Luo |
| 6,523,627 B2 | 2/2003 | Fukuda |
| 6,523,634 B1 | 2/2003 | Gagnon |
| RE38,012 E | 3/2003 | Ochab |
| D472,193 S | 3/2003 | Sinkwitz |
| 6,547,224 B2 | 4/2003 | Jensen |
| 6,553,761 B2 | 4/2003 | Beck |
| 6,557,922 B1 | 5/2003 | Hommel |
| 6,581,716 B1 | 6/2003 | Matsuura |
| 6,582,002 B2 | 6/2003 | Hogan |
| D476,935 S | 7/2003 | Boyer |
| 6,588,536 B1 | 7/2003 | Chiu |
| 6,622,806 B1 | 9/2003 | Matsuura |
| 6,622,968 B1 | 9/2003 | St et al. |
| 6,626,256 B2 | 9/2003 | Dennison |
| 6,626,260 B2 | 9/2003 | Gagnon |
| 6,655,717 B1 | 12/2003 | Wang |
| 6,695,329 B2 | 2/2004 | Handa |
| 6,695,566 B2 | 2/2004 | Rodriguez Navio |
| 6,722,463 B1 | 4/2004 | Reese |
| 6,725,962 B1 | 4/2004 | Fukuda |
| D490,018 S | 5/2004 | Berg |
| 6,732,830 B2 | 5/2004 | Gagnon |
| 6,745,862 B2 | 6/2004 | Morii |
| 6,752,235 B1 | 6/2004 | Bell et al. |
| 6,767,022 B1 | 7/2004 | Chevalier |
| D493,749 S | 8/2004 | Duncan |
| D494,890 S | 8/2004 | Katoh |
| 6,786,526 B1 | 9/2004 | Blalock |
| D497,324 S | 10/2004 | Chestnut |
| D497,327 S | 10/2004 | Lai |

(56) References Cited

U.S. PATENT DOCUMENTS

| | | | |
|---|---|---|---|
| 6,799,779 B2 | 10/2004 | Shibayama |
| 6,799,781 B2 | 10/2004 | Rasidescu |
| D498,435 S | 11/2004 | Saito |
| 6,820,708 B2 | 11/2004 | Nakamura |
| 6,827,184 B1 | 12/2004 | Lin |
| D501,570 S | 2/2005 | Tandrup |
| 6,860,826 B1 | 3/2005 | Johnson |
| 6,868,932 B1 | 3/2005 | Davis |
| D503,658 S | 4/2005 | Lu |
| D503,905 S | 4/2005 | Saito |
| 6,892,842 B2 | 5/2005 | Bouffard |
| D507,766 S | 7/2005 | McMahon |
| 6,916,142 B2 | 7/2005 | Hansen et al. |
| D508,224 S | 8/2005 | Mays |
| 6,923,507 B1 | 8/2005 | Billberg et al. |
| 6,938,508 B1 | 9/2005 | Saagge |
| 6,938,908 B2 | 9/2005 | Oda et al. |
| 6,942,050 B1 | 9/2005 | Honkala |
| D511,317 S | 11/2005 | Tanaka |
| 6,966,399 B2 | 11/2005 | Tanigaki |
| 6,978,857 B2 | 12/2005 | Korenjak |
| 7,000,931 B1 | 2/2006 | Chevalier |
| 7,004,137 B2 | 2/2006 | Kunugi |
| D519,439 S | 4/2006 | Dahl |
| D521,413 S | 5/2006 | Katoh |
| 7,040,437 B1 | 5/2006 | Fredrickson |
| 7,055,454 B1 | 6/2006 | Whiting |
| 7,077,233 B2 | 7/2006 | Hasegawa |
| 7,096,988 B2 | 8/2006 | Moriyama |
| 7,124,853 B1 | 10/2006 | Kole, Jr. |
| 7,125,134 B1 | 10/2006 | Hedlund et al. |
| 7,147,075 B2 | 12/2006 | Tanaka |
| D535,215 S | 1/2007 | Turner |
| 7,159,557 B2 | 1/2007 | Yasuda |
| 7,165,702 B1 | 1/2007 | Billberg |
| 7,168,516 B2 | 1/2007 | Nozaki |
| 7,172,232 B2 | 2/2007 | Chiku |
| 7,182,169 B2 | 2/2007 | Suzuki |
| 7,185,732 B2 | 3/2007 | Saito |
| 7,210,547 B2 | 5/2007 | Nojima |
| 7,213,669 B2 | 5/2007 | Fecteau |
| 7,216,733 B2 | 5/2007 | Iwami |
| 7,222,882 B2 | 5/2007 | Boucher |
| 7,237,789 B1 | 7/2007 | Herman |
| 7,239,032 B1 | 7/2007 | Wilson et al. |
| 7,240,472 B2 | 7/2007 | Evers |
| 7,240,960 B2 | 7/2007 | Fallis et al. |
| D548,662 S | 8/2007 | Markefka |
| D549,133 S | 8/2007 | LePage |
| 7,258,355 B2 | 8/2007 | Amano |
| 7,275,512 B2 | 10/2007 | Deiss |
| 7,287,619 B2 | 10/2007 | Tanaka |
| D555,036 S | 11/2007 | Eck |
| 7,311,171 B2 | 12/2007 | Seki et al. |
| D563,274 S | 3/2008 | Ramos |
| 7,347,296 B2 | 3/2008 | Nakamura |
| 7,357,207 B2 | 4/2008 | Vaisanen |
| 7,357,211 B2 | 4/2008 | Inui |
| 7,367,247 B2 | 5/2008 | Horiuchi |
| 7,367,417 B2 | 5/2008 | Inui |
| 7,370,724 B2 | 5/2008 | Saito |
| 7,374,012 B2 | 5/2008 | Inui |
| 7,377,351 B2 | 5/2008 | Smith |
| 7,380,622 B2 | 6/2008 | Shimizu |
| 7,380,805 B1 | 6/2008 | Turner |
| 7,387,180 B2 | 6/2008 | Konno |
| 7,401,797 B2 | 7/2008 | Cho |
| D578,433 S | 10/2008 | Kawaguchi |
| D578,934 S | 10/2008 | Tanaka |
| 7,431,024 B2 | 10/2008 | Buchwitz et al. |
| 7,438,147 B2 | 10/2008 | Kato |
| 7,458,593 B2 | 12/2008 | Saito |
| 7,481,293 B2 | 1/2009 | Ogawa |
| D586,694 S | 2/2009 | Huang |
| 7,490,694 B1 | 2/2009 | Berg |
| 7,497,299 B2 | 3/2009 | Kobayashi |
| 7,497,471 B2 | 3/2009 | Kobayashi |
| 7,500,709 B2 | 3/2009 | Heselhaus |
| D592,998 S | 5/2009 | Woodard, Jr. |
| 7,540,511 B2 | 6/2009 | Saito |
| D595,613 S | 7/2009 | Lai |
| 7,559,596 B2 | 7/2009 | Garska et al. |
| 7,565,944 B2 | 7/2009 | Sakamoto |
| 7,565,945 B2 | 7/2009 | Okada |
| 7,568,732 B2 | 8/2009 | Schlup, Jr. |
| 7,578,523 B2 | 8/2009 | Kosuge et al. |
| 7,588,010 B2 | 9/2009 | Mochizuki |
| 7,600,603 B2 | 10/2009 | Okada |
| 7,604,084 B2 | 10/2009 | Okada |
| 7,610,132 B2 | 10/2009 | Yanai |
| D604,201 S | 11/2009 | Kawaguchi |
| 7,623,327 B2 | 11/2009 | Ogawa |
| D605,555 S | 12/2009 | Tanaka |
| D606,900 S | 12/2009 | Flores |
| D610,514 S | 2/2010 | Eck |
| 7,665,792 B1 | 2/2010 | Flynn |
| 7,677,599 B2 | 3/2010 | Kuerten et al. |
| 7,677,634 B2 | 3/2010 | Flynn |
| 7,694,769 B2 | 4/2010 | McGuire |
| 7,708,106 B1 | 5/2010 | Bergman |
| 7,728,212 B2 | 6/2010 | Fujishima |
| 7,740,103 B2 | 6/2010 | Sasajima |
| 7,742,851 B2 | 6/2010 | Hisada |
| D622,631 S | 8/2010 | Lai |
| 7,788,212 B2 | 8/2010 | Beckmann |
| D625,662 S | 10/2010 | Li |
| 7,819,220 B2 | 10/2010 | Sunsdahl |
| D631,395 S | 1/2011 | Tandrup |
| 7,871,106 B2 | 1/2011 | Leonard et al. |
| RE42,086 E | 2/2011 | Saito et al. |
| 7,891,684 B1 | 2/2011 | Luttinen |
| 7,896,422 B2 | 3/2011 | Willard et al. |
| 7,913,782 B1 | 3/2011 | Foss |
| 7,922,201 B2 | 4/2011 | Kuerten et al. |
| 7,967,365 B2 | 6/2011 | Gerhardt et al. |
| 7,971,904 B2 | 7/2011 | David |
| 8,047,324 B2 | 11/2011 | Yao |
| D650,311 S | 12/2011 | Bracy |
| 8,152,880 B2 | 4/2012 | Matschl |
| 8,167,325 B2 | 5/2012 | Lee |
| 8,191,952 B2 | 6/2012 | Mokhtari et al. |
| 8,353,534 B2 | 1/2013 | Arnold et al. |
| 8,381,855 B2 * | 2/2013 | Suzuki .................. B60K 11/04 |
| | | 180/296 |
| 8,485,303 B2 | 7/2013 | Yamamoto et al. |
| 8,544,582 B2 | 10/2013 | Kaku et al. |
| 8,596,709 B2 | 12/2013 | Ugolini |
| 8,613,335 B2 | 12/2013 | Deckard |
| 8,613,336 B2 | 12/2013 | Deckard |
| 8,613,337 B2 | 12/2013 | Kinsman |
| 8,657,050 B2 | 2/2014 | Yamaguchi |
| 8,827,019 B2 | 9/2014 | Deckard |
| 8,827,020 B2 | 9/2014 | Deckard |
| 8,827,023 B2 | 9/2014 | Matsuda |
| 8,998,253 B2 | 4/2015 | Novotny et al. |
| 8,998,305 B2 | 4/2015 | Obata et al. |
| 9,592,713 B2 | 3/2017 | Kinsman |
| 9,725,023 B2 | 8/2017 | Miller |
| 9,884,647 B2 | 2/2018 | Peterson et al. |
| 2001/0007396 A1 | 7/2001 | Mizuta |
| 2001/0013433 A1 | 8/2001 | Szymkowiak |
| 2002/0023792 A1 | 2/2002 | Bouffard |
| 2002/0147072 A1 | 10/2002 | Goodell et al. |
| 2002/0178968 A1 | 12/2002 | Christensen |
| 2003/0001409 A1 | 1/2003 | Semple et al. |
| 2003/0132075 A1 | 7/2003 | Drivers |
| 2003/0137121 A1 | 7/2003 | Lenz |
| 2003/0173754 A1 | 9/2003 | Bryant |
| 2003/0213628 A1 | 11/2003 | Rioux |
| 2004/0079523 A1* | 4/2004 | Shiraishi ............ B60H 1/00735 |
| | | 165/204 |
| 2004/0079561 A1 | 4/2004 | Ozawa et al. |
| 2004/0108159 A1 | 6/2004 | Rondeau et al. |
| 2004/0153782 A1 | 8/2004 | Fukui |

(56) References Cited

U.S. PATENT DOCUMENTS

| | | |
|---|---|---|
| 2004/0195018 A1 | 10/2004 | Inui |
| 2004/0195019 A1 | 10/2004 | Kato |
| 2004/0195034 A1 | 10/2004 | Kato |
| 2004/0195797 A1 | 10/2004 | Nash |
| 2004/0206567 A1 | 10/2004 | Kato |
| 2004/0221669 A1 | 11/2004 | Shimizu |
| 2004/0226384 A1 | 11/2004 | Shimizu |
| 2004/0231900 A1 | 11/2004 | Tanaka |
| 2005/0006168 A1 | 1/2005 | Iwasaka |
| 2005/0012421 A1 | 1/2005 | Fukuda |
| 2005/0045414 A1 | 3/2005 | Takagi |
| 2005/0056472 A1 | 3/2005 | Smith |
| 2005/0073140 A1 | 4/2005 | Boucher |
| 2005/0173177 A1 | 8/2005 | Smith |
| 2005/0173180 A1 | 8/2005 | Hypes |
| 2005/0206111 A1 | 9/2005 | Gibson |
| 2005/0231145 A1 | 10/2005 | Mukai |
| 2005/0235767 A1 | 10/2005 | Shimizu |
| 2005/0235768 A1 | 10/2005 | Shimizu |
| 2005/0242677 A1 | 11/2005 | Akutsu |
| 2005/0246052 A1 | 11/2005 | Coleman |
| 2005/0248116 A1 | 11/2005 | Fanson |
| 2005/0257989 A1 | 11/2005 | Iwam |
| 2005/0257990 A1 | 11/2005 | Shimizu |
| 2005/0267660 A1 | 12/2005 | Fujiwara |
| 2005/0269141 A1 | 12/2005 | Davis |
| 2006/0000458 A1 | 1/2006 | Dees |
| 2006/0006010 A1 | 1/2006 | Nakamura |
| 2006/0022619 A1 | 2/2006 | Koike |
| 2006/0032690 A1 | 2/2006 | Inomoto |
| 2006/0032700 A1 | 2/2006 | Vizanko |
| 2006/0042862 A1 | 3/2006 | Saito |
| 2006/0043754 A1 | 3/2006 | Smith |
| 2006/0055139 A1 | 3/2006 | Furumi |
| 2006/0065472 A1 | 3/2006 | Ogawa |
| 2006/0071441 A1 | 4/2006 | Mathis |
| 2006/0075840 A1 | 4/2006 | Saito |
| 2006/0076180 A1 | 4/2006 | Saito |
| 2006/0108174 A1 | 5/2006 | Saito |
| 2006/0162990 A1 | 7/2006 | Saito |
| 2006/0169525 A1 | 8/2006 | Saito |
| 2006/0175124 A1 | 8/2006 | Saito |
| 2006/0180383 A1 | 8/2006 | Bataille |
| 2006/0180385 A1 | 8/2006 | Yanai |
| 2006/0185741 A1 | 8/2006 | McKee |
| 2006/0185927 A1 | 8/2006 | Sakamoto |
| 2006/0191734 A1 | 8/2006 | Kobayashi |
| 2006/0191735 A1 | 8/2006 | Kobayashi |
| 2006/0191737 A1 | 8/2006 | Kobayashi |
| 2006/0191739 A1 | 8/2006 | Koga |
| 2006/0196721 A1 | 9/2006 | Saito |
| 2006/0196722 A1 | 9/2006 | Makabe |
| 2006/0201270 A1 | 9/2006 | Kobayashi |
| 2006/0207823 A1 | 9/2006 | Okada |
| 2006/0207824 A1 | 9/2006 | Saito |
| 2006/0207825 A1 | 9/2006 | Okada |
| 2006/0208564 A1 | 9/2006 | Yuda |
| 2006/0212200 A1 | 9/2006 | Yanai |
| 2006/0219452 A1 | 10/2006 | Okada |
| 2006/0219463 A1 | 10/2006 | Seki |
| 2006/0219469 A1 | 10/2006 | Okada |
| 2006/0219470 A1 | 10/2006 | Imagawa |
| 2006/0236980 A1 | 10/2006 | Maruo |
| 2006/0270503 A1 | 11/2006 | Suzuki |
| 2006/0288800 A1 | 12/2006 | Mukai |
| 2007/0023566 A1 | 2/2007 | Howard |
| 2007/0068726 A1 | 3/2007 | Shimizu |
| 2007/0074588 A1 | 4/2007 | Harata |
| 2007/0074589 A1 | 4/2007 | Harata |
| 2007/0074927 A1 | 4/2007 | Okada |
| 2007/0074928 A1 | 4/2007 | Okada |
| 2007/0095601 A1 | 5/2007 | Okada |
| 2007/0096449 A1 | 5/2007 | Okada |
| 2007/0119650 A1 | 5/2007 | Eide |
| 2007/0175696 A1 | 8/2007 | Saito |
| 2007/0215404 A1 | 9/2007 | Lan |
| 2007/0221430 A1 | 9/2007 | Allison |
| 2007/0227793 A1 | 10/2007 | Nozaki |
| 2007/0242398 A1 | 10/2007 | Ogawa |
| 2007/0256882 A1 | 11/2007 | Bedard |
| 2007/0261904 A1 | 11/2007 | Fecteau |
| 2007/0290493 A1 | 12/2007 | David |
| 2008/0013564 A1 | 1/2008 | Koski |
| 2008/0023240 A1* | 1/2008 | Sunsdahl ............ B62D 21/183 180/68.2 |
| 2008/0023249 A1 | 1/2008 | Sunsdahl |
| 2008/0041335 A1 | 2/2008 | Buchwitz |
| 2008/0053738 A1 | 3/2008 | Kosuge |
| 2008/0053743 A1 | 3/2008 | Tomita |
| 2008/0199253 A1 | 8/2008 | Okada |
| 2008/0257630 A1 | 10/2008 | Takeshima |
| 2008/0284124 A1 | 11/2008 | Brady |
| 2008/0308334 A1 | 12/2008 | Leonard |
| 2009/0000849 A1 | 1/2009 | Leonard |
| 2009/0001748 A1 | 1/2009 | Brown |
| 2009/0071737 A1 | 3/2009 | Leonard |
| 2009/0071739 A1 | 3/2009 | Leonard |
| 2009/0078491 A1 | 3/2009 | Tsutsumikoshi |
| 2009/0090575 A1 | 4/2009 | Nagasaka |
| 2009/0091101 A1 | 4/2009 | Leonard |
| 2009/0121518 A1 | 5/2009 | Leonard |
| 2009/0152035 A1 | 6/2009 | Okada |
| 2009/0152036 A1 | 6/2009 | Okada |
| 2009/0178871 A1 | 7/2009 | Sunsdahl |
| 2009/0205891 A1 | 8/2009 | Parrett |
| 2009/0302590 A1 | 12/2009 | Van Bronkhorst |
| 2010/0019539 A1 | 1/2010 | Nakamura et al. |
| 2010/0060026 A1 | 3/2010 | Bowers |
| 2010/0090430 A1 | 4/2010 | Weston |
| 2010/0090797 A1 | 4/2010 | Koenig |
| 2010/0155170 A1 | 6/2010 | Melvin |
| 2010/0187032 A1 | 7/2010 | Yamamura |
| 2010/0317484 A1 | 12/2010 | Gillingham |
| 2010/0317485 A1 | 12/2010 | Gillingham |
| 2011/0094813 A1 | 4/2011 | Suzuki |
| 2011/0094816 A1 | 4/2011 | Suzuki |
| 2012/0031693 A1* | 2/2012 | Deckard ................ B60K 17/08 180/68.3 |
| 2012/0223500 A1* | 9/2012 | Kinsman ............... B60G 7/008 280/124.153 |
| 2013/0087396 A1 | 4/2013 | Itoo |
| 2013/0087397 A1 | 4/2013 | Yamamoto et al. |
| 2013/0319784 A1* | 12/2013 | Kennedy ................ B60N 2/24 180/292 |
| 2014/0008136 A1 | 1/2014 | Bennett |
| 2014/0034409 A1* | 2/2014 | Nakamura ........... B62D 21/186 180/291 |
| 2014/0103627 A1* | 4/2014 | Deckard ................ B60N 2/90 280/807 |
| 2014/0251712 A1 | 9/2014 | Brady et al. |
| 2014/0300137 A1 | 10/2014 | Komiya |
| 2014/0360794 A1 | 12/2014 | Tallman |
| 2015/0061275 A1 | 3/2015 | Deckard et al. |
| 2015/0076866 A1 | 3/2015 | Mohrlock |
| 2015/0210137 A1 | 7/2015 | Kinsman |
| 2015/0259011 A1 | 9/2015 | Deckard et al. |
| 2016/0031492 A1 | 2/2016 | Suzuki et al. |
| 2016/0090124 A1 | 3/2016 | Kaneko et al. |
| 2016/0108866 A1 | 4/2016 | Dewit |
| 2016/0176283 A1 | 6/2016 | Hicke |
| 2016/0176284 A1 | 6/2016 | Nugteren |
| 2016/0257335 A1 | 9/2016 | Dieudonne et al. |
| 2016/0347137 A1 | 12/2016 | Despres-Nadeau et al. |
| 2016/0347350 A1 | 12/2016 | Heon |
| 2016/0347366 A1 | 12/2016 | Larocque |
| 2017/0001549 A1* | 1/2017 | Bessho ................ B60K 13/04 |
| 2017/0253273 A1* | 9/2017 | Kinsman ............. B62D 21/183 |

FOREIGN PATENT DOCUMENTS

| | | |
|---|---|---|
| DE | 0116605 | 2/1900 |
| DE | 1755101 | 4/1971 |
| DE | 2210070 | 9/1973 |

(56) References Cited

FOREIGN PATENT DOCUMENTS

| | | |
|---|---|---|
| DE | 3033707 | 4/1982 |
| DE | 102010017784 A1 | 1/2012 |
| EP | 0237085 | 9/1987 |
| EP | 0238077 A2 | 9/1987 |
| EP | 0575962 | 12/1993 |
| EP | 0709247 A2 | 5/1996 |
| EP | 0794096 A2 | 9/1997 |
| EP | 0893618 | 1/1999 |
| EP | 1215107 A1 | 6/2002 |
| EP | 1557345 A2 | 7/2005 |
| EP | 1564123 A2 | 8/2005 |
| FR | 2460797 | 1/1981 |
| GB | 2081191 | 2/1982 |
| GB | 2316923 | 12/1993 |
| GB | 2347398 | 9/2000 |
| GB | 2423066 | 8/2003 |
| JP | 60067206 | 4/1985 |
| JP | 20050193788 | 3/1999 |
| JP | 11-334447 A | 12/1999 |
| JP | 2000-177434 A | 6/2000 |
| JP | 3385382 B2 | 3/2003 |
| JP | 2004308453 | 11/2004 |
| JP | 2006232058 | 9/2006 |
| JP | 2006232061 | 9/2006 |
| JP | 2006256579 | 9/2006 |
| JP | 2006256580 | 9/2006 |
| JP | 2006281839 | 10/2006 |
| JP | 2007-038709 A | 2/2007 |
| JP | 2007106319 | 4/2007 |
| WO | WO 2007/103197 | 9/2007 |
| WO | WO 2008/013564 | 1/2008 |
| WO | WO 2009/096998 | 6/2009 |
| WO | WO 2010/074990 | 7/2010 |
| WO | 20121022323 A1 | 2/2012 |
| WO | 20141059258 A1 | 4/2014 |

OTHER PUBLICATIONS

High-Performance "Truck Steering" Automotive Engineering, Society of Automotive Engineers, Warrendale, Us, vol. 98, No. 4, dated Apr. 1, 1990; pp. 56-60.
Honda Hippo 1800 New Competition for Yamaha's Rhino, Dirt Wheels Magazine, dated Apr. 2006; pp. 91-92.
Improved Fox Shox, Motorcoss Action, dated Mar. 1977; 1 page.
Polaris Ranger 2009 Brochure, Polaris Industries Inc., copyright 2008; 32 pages.
Redline Specs, available at www.RedlinePerforms.com, copyright 2008; 2 pages.
Photograph of the Redline Riot, available at http://www.buggyworksandrails.com/images/2012_0657.JPG; dated Jun. 28, 2010; 1 page.
Troy Merrifield & Damon Flippo, *Rise of the Machine: Let the "Revolution" Begin. One Seat at a Time*, CartWheelin' Magazine, published at least as early as Jan. 2008, available at http://www.1redline.com/news_events/PDF/cart_wheelin_article.pdf, last accessed on Feb. 15, 2012; pp. 14-19.
Troy Merrifield, *Redline's Rockin' Riot*, UTV Off-Road Magazine, published in vol. 4, Issue 1, Feb./Mar. 2009, available at http://www.1redline.com/news_evenets/PDF/Redline_Riot_Article_01_2009.pdf, last accessed on Feb. 15, 2012; pp. 20-24.
Can-Am Specifications for Commander 1000, copyright 2010; 1 page.
Can-Am Specifications for Commander 800R, copyright 2010; 1 page.
Can-Am, *An 85-HP Side-By-Side. No, that's not a typo.*, dated Jun. 25, 2010; 3 pages.
2009 Honda Big Red, ATV Illustrated, at http://www.atvillustrated.com/?q=node/6615/20/2008; 6 pages.
Arctic Cat, company website, Prowler XT 650 hl, undated; 9 pages.
ATV Illustrated, "2009 Honda Big Red", retrieved from http://www.atvillustrated.com/?q=node/661, dated May 20, 2008; 6 pages.
Boss Plow System for Ranger, at http://www.purepolaris.com/Detail.aspx?ItemD=2876870(PolarisPGACatalog), dated May 14, 2008; 2 pages.
Boss Smarthitch 2 at http://www.bossplow.com/smarthitch.html, dated May 14, 2008; 13 pages.
Buyers' Guide Supplement, 2006 Kart Guide, Powersports Business Magazine; 6 pages.
Club Car, company website, product pages for XRT 1500 SE, undated; 2 pages.
DuneGuide.com, "Product Review 2009 Honda Big Red MUV," retrieved from http://www.duneguide.com/ProductReview_Honda_BigRed.htm, dated May 20, 2008; 3 pages.
Eulenbach, Dr. Ing. Dieter, NIVOMAT: The Automatic Level Control System with Spring Function and Damping Function, Lecture given as part of the course "Springing and damping systems for road and rail vehicles" at the Technical Academy of Esslingen, dated Oct. 11, 2000; 18 pages.
Yamaha, company website, 2006 Rhino 660 Auto 4×4, copyright 2006; 4 pages.
Ray Sedorchuk, New for 2004, Yamaha Rhino 660 4×4, ATV Connection Magazine, copyright 1996-2005; 4 pages.
Honda 89 FL400R Pilot Service Manual, Honda Motor Co. Ltd., copyright 1988; 265 pages.
Welcome to Ranger Country brochure, Polaris Industries Inc., copyright 2005; 24 pages.
Welcome to Ranger Country brochure, Polaris Industries Inc., copyright 2006; 20 pages.
Work/Play Only Ranger brochure, Polaris Industries Inc., copyright 2007; 28 pages.
Yamaha, company website, 2006 Rhino 450 Auto 4×4, copyright 2006; 4 pages.
Yamaha, company website, 2006 Rhino 660 Auto 4×4 Exploring Edition, copyright 2006; 13 pages.
Yamaha, company website, 2006 Rhino 660 Auto 4×4 Special Edition, copyright 2006; 4 pages.
Shock Owner's Manual: Float ATV + Snowmobile-Fox Racing Shox, copyright 2004; 21 pages.
Shock Owner's Manual: Float MXR—Fox Racing Shox, copyright 2006; 16 pages.
Shock Owner's Manual: Float X Evol—Snowmobile Applications, copyright 2006; 32 pages.
Improved Fox Shox, Motorcross Action, dated Mar. 1977; 1 page.
Troy Merrifield, Redline's Rockin' Riot, UTV Off-Road Magazine, published in vol. 4, Issue 1, Feb./Mar. 2009, available at http://www.1redline.com/news_events/PDF/Redline_Riot_Article_01_2009_pdf, last accessed on Feb. 15, 2012; pp. 20-24.
Brochure, Fully Equipped LTATV Sales, Copyright 2010-2011, available at http://chrishainesoffroad.com/vehicles.pdf, last accessed Jul. 15, 2014; 2 pages.
Examination Report issued by the European Patent Office for European Application No. 13716130.3, dated Oct. 30, 2015; 3 pages.
International Preliminary Report on Patentability (Chapter I) for International Application No. PCT/US2013/034530 issued by the International Bureau of WIPO dated Oct. 1, 2014; 7 pages.
International Preliminary Report on Patentability (Chapter II) for International Application No. PCT/US2008/003483 issued by the European Patent Office dated May 11, 2009; 20 pages.
International Preliminary Report on Patentability for International Application No. PCT/US2008/003480 issued by the International Bureau of WIPO dated Sep. 22, 2009; 13 pages.
International Preliminary Report on Patentability for International Application No. PCT/US2008/003485 issued by the International Bureau of WIPO dated Sep. 22, 2009; 8 pages.
International Search Report and Written Opinion for International Application No. PCT/US2008/003480 issued by the Euopean Patent Office dated Sep. 1, 2008; 17 pages.
International Search Report and Written Opinion for International Application No. PCT/US2008/003483 issued by the European Patent Office dated Oct. 2, 2008; 18 pages.
International Search Report and Written Opinion for International Application No. PCT/US2008/003485 issued by the European Patent Office dated Aug. 27, 2008; 15 pages.

(56) References Cited

OTHER PUBLICATIONS

International Search Report and Written Opinion for International Application No. PCT/US2013/034530, issued by the European Patent Office, dated Mar. 27, 2014; 10 pages.
Strike Razor: Light Tactical Vehicle, Advanced Mobile Systems, 2 pages, copyright 2011.
Webpage, RP Advanced Mobile Systems: Military SxS Light Tactical Defense Vehicles, available at least as early as Mar. 20, 2012; available at https://web.archive.org/web/20120324210549/http://www.rpadvancemobilesyst-ems.com/, last accessed Jul. 15, 2014; 4 pages.

* cited by examiner

UTILITY VEHICLE

CROSS-REFERENCE TO RELATED APPLICATIONS

The present application is a continuation of U.S. patent application Ser. No. 14/965,226, filed Dec. 10, 2015, and entitled "UTILITY VEHICLE" No. PLR-09-27113.01P), the complete disclosure of which is expressly incorporated by reference herein.

BACKGROUND OF THE DISCLOSURE

The present disclosure relates to vehicles, and more particularly to side-by-side utility and all-terrain vehicles.

Generally, all-terrain vehicles ("ATVs") and utility vehicles ("UVs") are used to carry one or more passengers and cargo over a variety of terrain. Some ATVs and UVs may include side-by-side seating, in which a passenger may be seated next to the driver at the front of the vehicle. Side-by-side vehicles also may include a rear seating area to accommodate additional passengers in the vehicle. An upper frame assembly may be provided over the seating area(s) of the vehicle. Additionally, ATVs and UVs may provide a cargo area in the front and/or the rear of the vehicle to carry cargo.

SUMMARY OF THE DISCLOSURE

An illustrative embodiment of the present disclosure includes a vehicle comprising a frame assembly extending along a longitudinal axis of the vehicle and including a rear frame portion. The rear frame portion includes at least one upstanding member, at least one longitudinal member, and at least one coupling member coupled to the at least one upstanding member and the at least one longitudinal member. The vehicle also comprises at least one front ground-engaging member supporting the frame assembly, at least one rear ground-engaging member supporting the frame assembly, a drivetrain assembly operably coupled to the front and rear ground-engaging member, and a rear suspension assembly. The rear suspension assembly includes at least one radius rod operably coupled to the at least one rear ground-engaging member and angled less than 90° relative to the at least one longitudinal member.

Another illustrative embodiment of the present disclosure includes a vehicle comprising a frame assembly extending along a longitudinal axis of the vehicle and including a rear frame portion. The rear frame portion includes at least a first member, a second member, and a coupling member coupled to the first and second members. The vehicle also comprises at least one front ground-engaging member supporting the frame assembly, at least one rear ground-engaging member supporting the frame assembly, a drivetrain assembly operably coupled to the front and rear ground-engaging members, and a rear suspension assembly. The rear suspension assembly includes at least one radius rod pivotably coupled to the coupling member and configured to pivot in a vertical plane rearward of the coupling member.

A further illustrative embodiment of the present disclosure includes a frame assembly for a vehicle comprising a first member, a second member, and a coupling member including a first portion coupled to the first member, a second portion coupled to the second member, and a third portion configured to couple with a rear suspension assembly of the vehicle.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The foregoing aspects and many of the intended advantages of this invention will become more readily appreciated as the same becomes better understood by reference to the following detailed description when taken in conjunction with the accompanying drawings.

Figure 1:
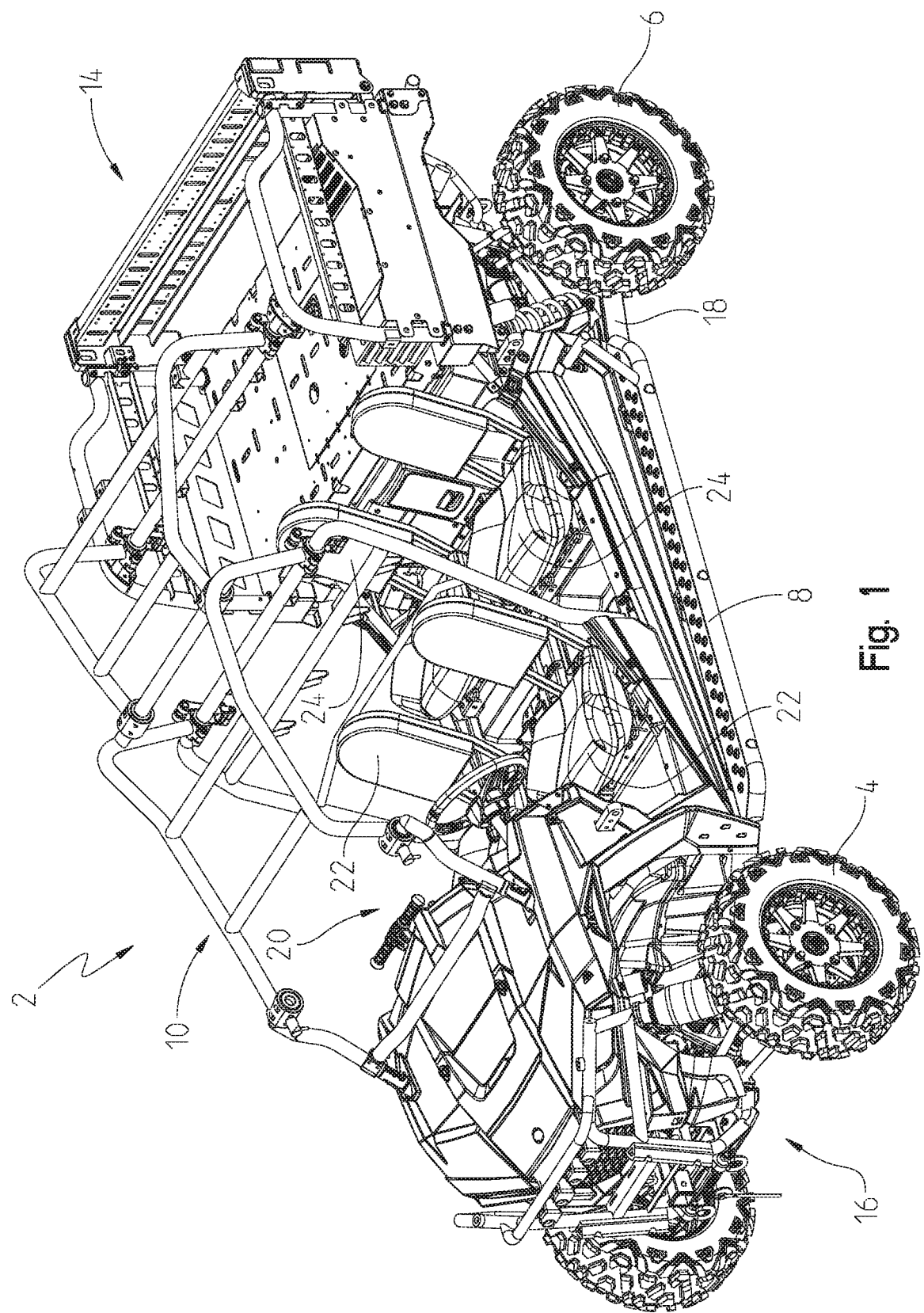
FIG. 1 is a left front perspective view of an illustrative vehicle of the present disclosure.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplifications set out herein illustrate embodiments of the invention, and such exemplifications are not to be construed as limiting the scope of the invention in any manner.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a utility vehicle, it should be understood that the features disclosed herein may have application to other types of vehicles such as all-terrain vehicles, motorcycles, watercraft, snowmobiles, and golf carts.

Referring to FIGS. 1-7, an illustrative embodiment of a vehicle 2 includes front ground-engaging members 4, rear ground-engaging members 6, a lower frame assembly 8, an upper frame assembly 10, a powertrain assembly 12, a cargo area 14, a front suspension assembly 16, and a rear suspension assembly 18. Front and rear ground-engaging members 4, 6 may be wheels with tires or, alternatively, may be tracks, such as the PROSPECTOR II tracks available from Polaris Industries, Inc. located at 2100 Highway 55 in Medina, Minn. 55340.

Figure 3:
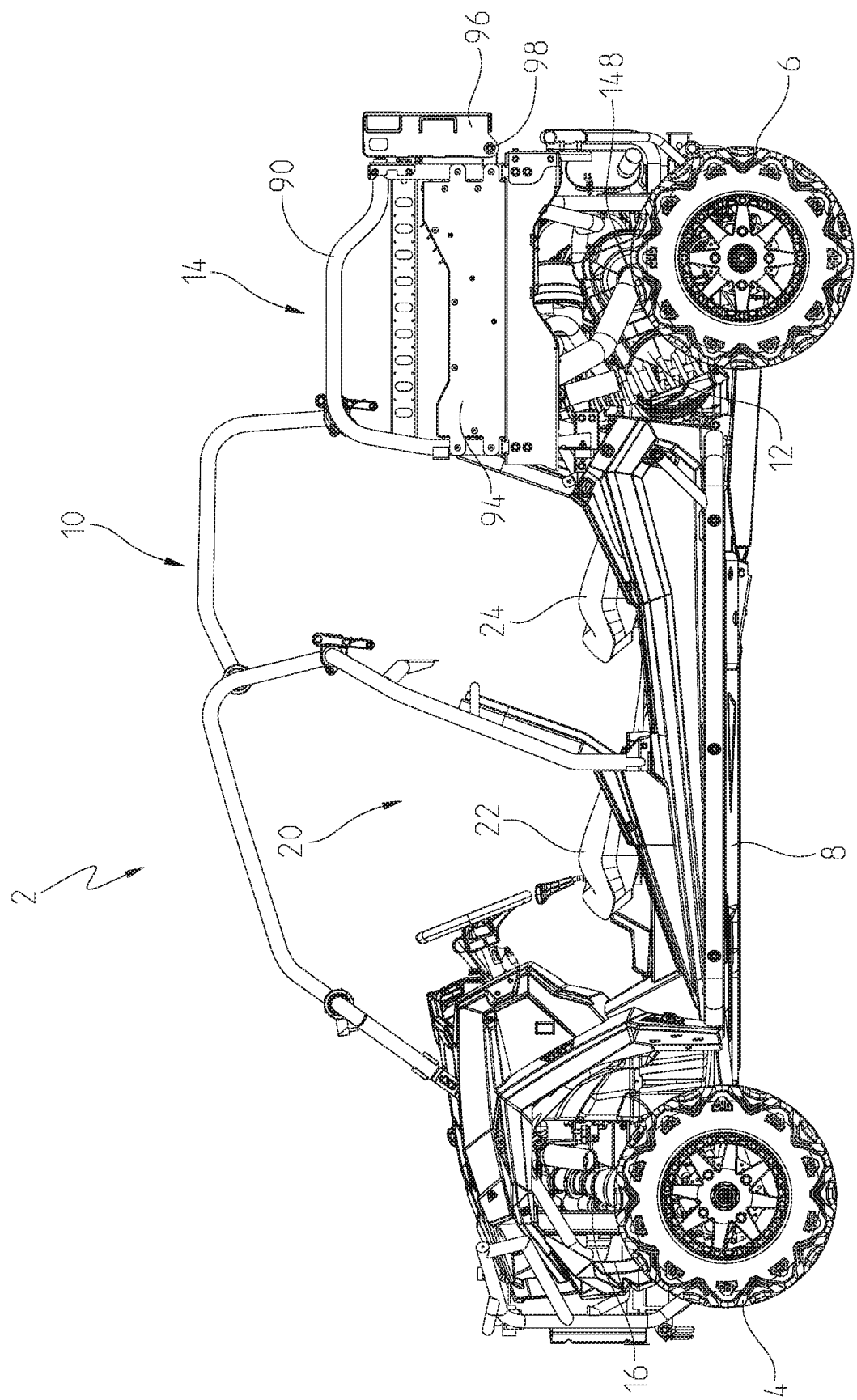
FIG. 3 is a left side view of the vehicle of FIG. 1.
Figure 4:
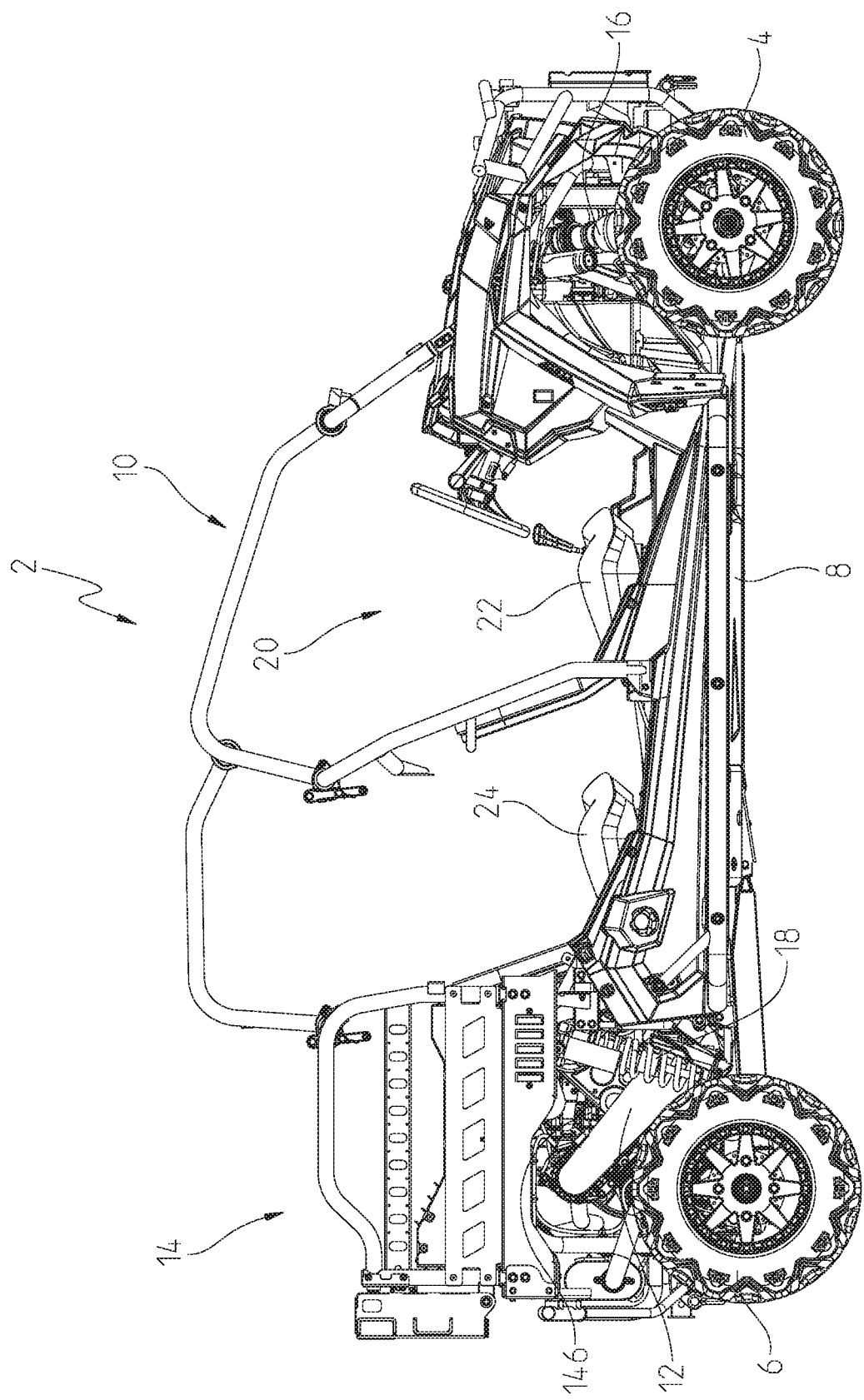
FIG. 4 is a right side view of the vehicle of FIG. 1.
Figure 5:
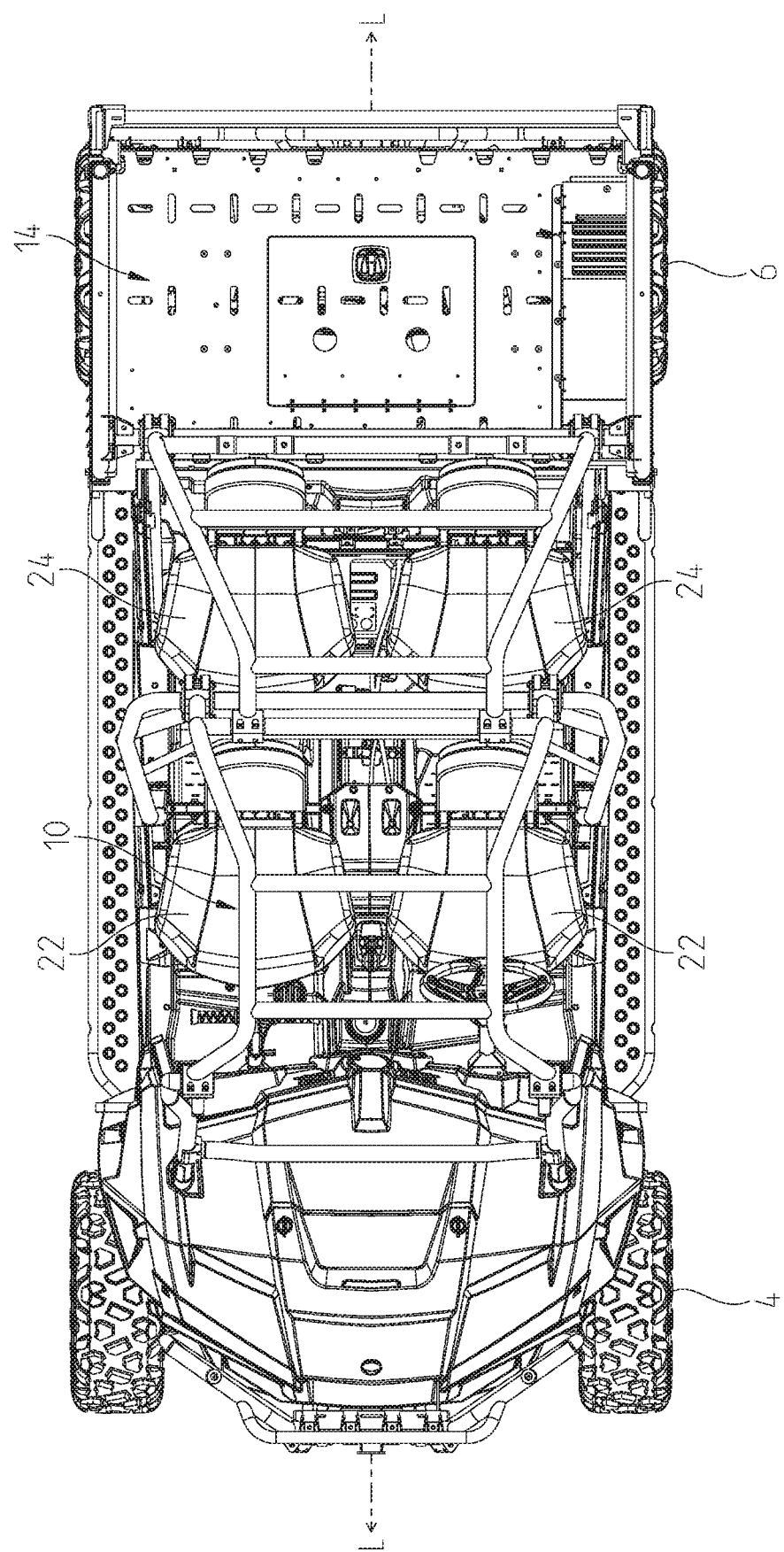
FIG. 5 is a top view of the vehicle of FIG. 1.
Figure 6:
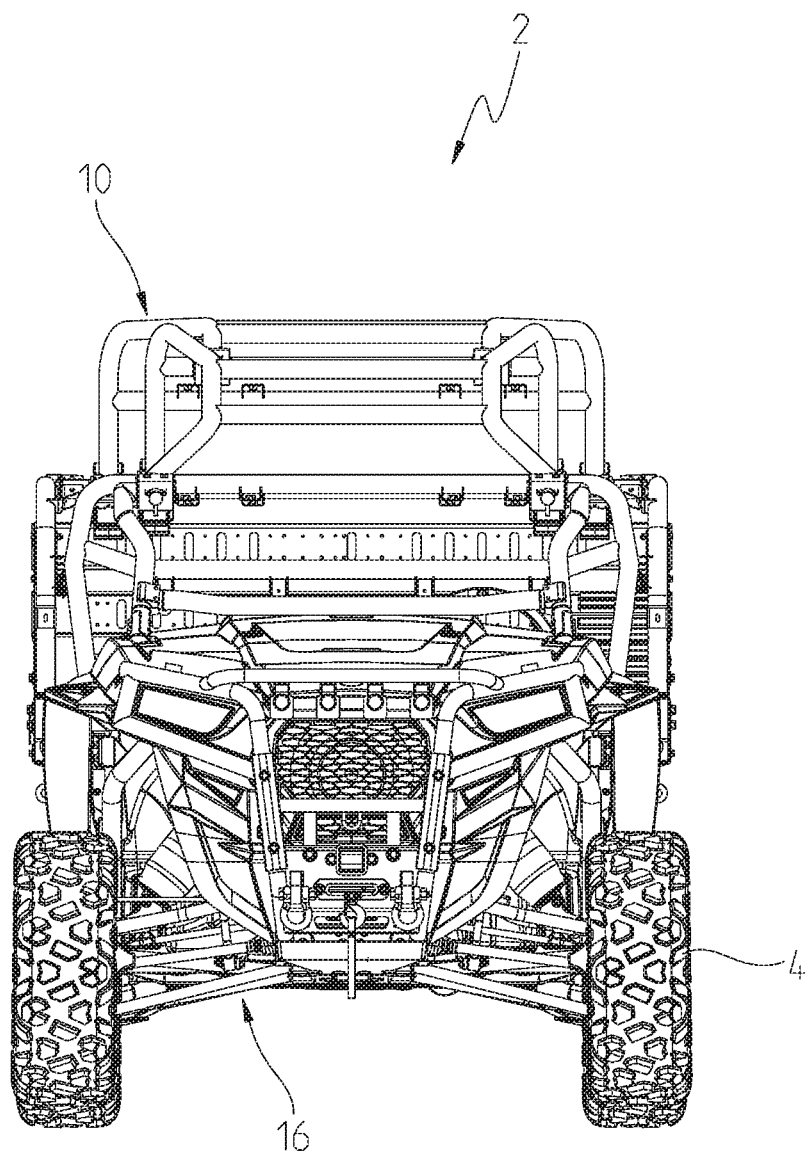
FIG. 6 is a front view of the vehicle of FIG. 1.
Figure 7:
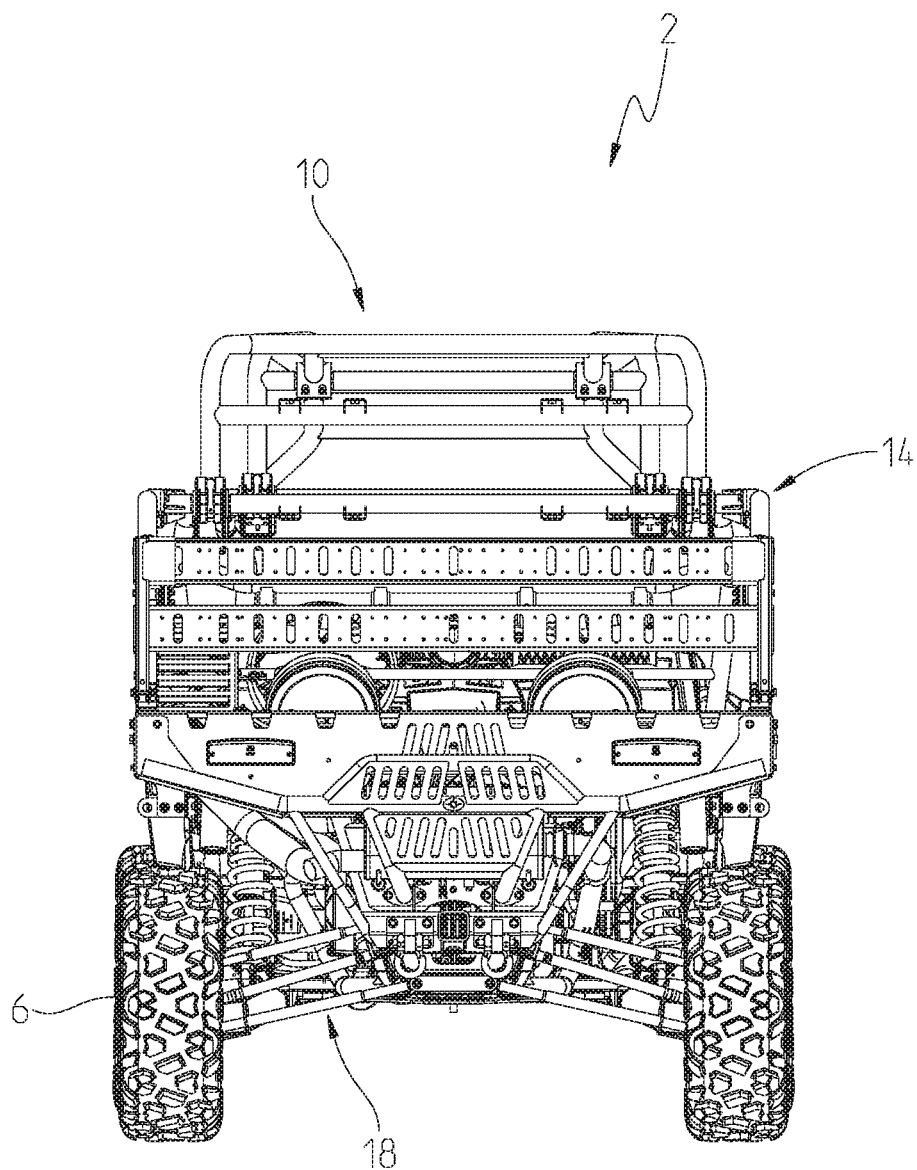
FIG. 7 is a rear view of the vehicle of FIG. 1.

Vehicle 2 may be referred to as a utility vehicle ("UV"), an all-terrain vehicle ("ATV"), or a side-by-side vehicle ("SxS") and is configured for travel over various terrains or surfaces. More particularly, vehicle 2 may be configured for military applications. Vehicle 2 includes an operator area 20 which includes side-by-side front seats 22 and also may include side-by-side rear seats 24. Seats 22, 24 are positioned forward of cargo area 14, which is configured to support any type of cargo thereon. Illustratively, cargo area 14 is positioned above powertrain assembly 12, as shown in FIGS. 3 and 4. Powertrain assembly 12 includes at least an engine 146 (FIG. 4), a transmission, illustratively a continuously variable transmission ("CVT") 148 (FIG. 3), front and rear differentials (not shown), and a drive shaft (not shown). In one embodiment, powertrain assembly 12 also includes a turbocharger 149 (FIG. 18) operably coupled to engine 146. Engine 146 may be configured to operate with gasoline, natural gas, or other sources of fuel, however, illustrative engine 146 operates with diesel fuel.

Referring to FIGS. 1-14, upper frame assembly 10 is shown. Upper frame assembly 10 is coupled to lower frame assembly 8 and extends upwardly therefrom. In particular, upper frame assembly 10 generally extends over operator area 20 and includes a front portion 26 generally positioned above front seats 22 and a rear portion 28 generally positioned above rear seats 24. Illustratively, upper frame assembly 10 extends longitudinally along a longitudinal axis L (FIG. 5) of vehicle 2 and is positioned generally intermediate cargo area 14 and front ground-engaging members 4.

Figure 8:
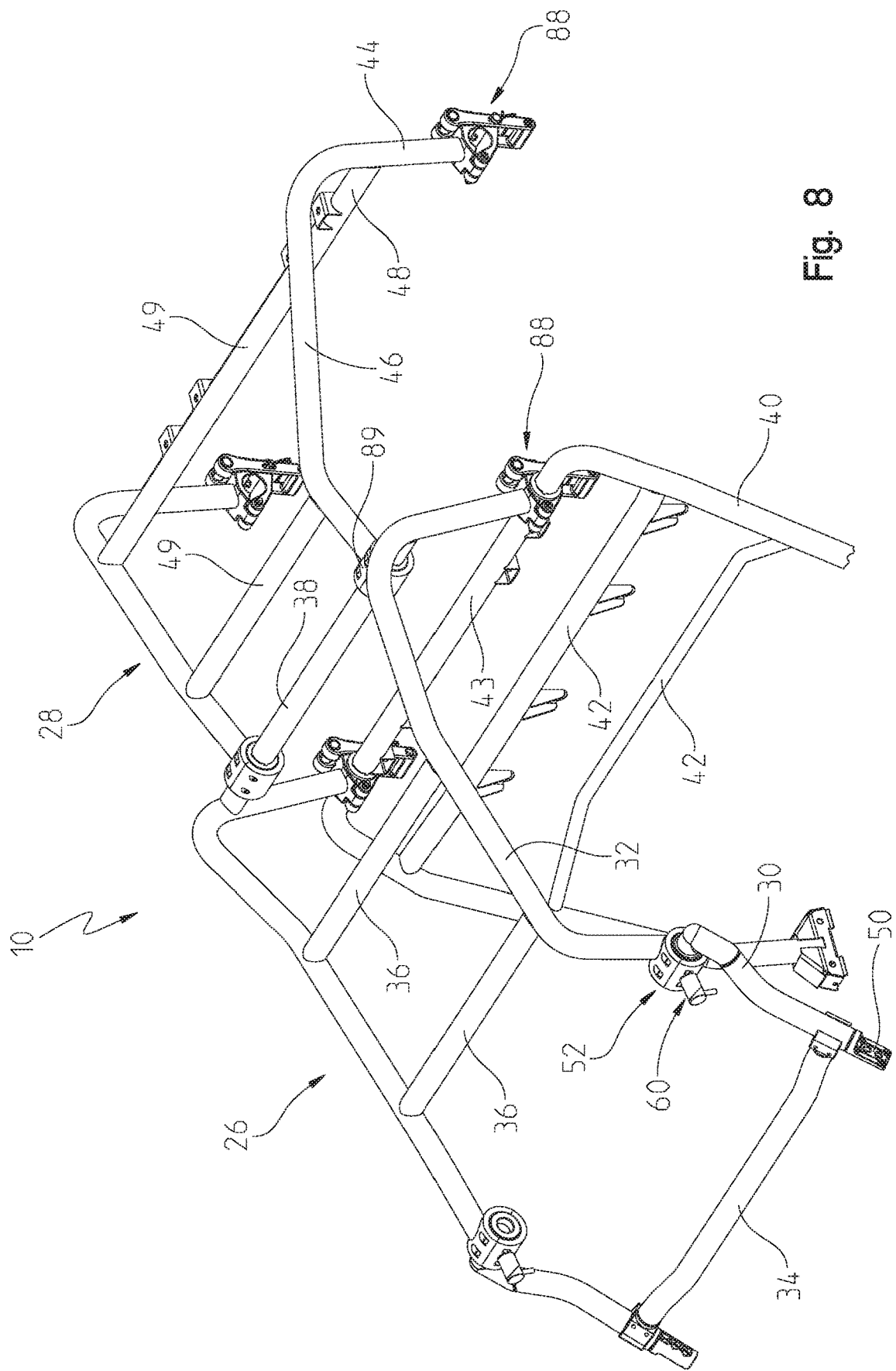
FIG. 8 is a left front perspective view of an upper frame assembly of the vehicle of FIG. 1.
Figure 9:
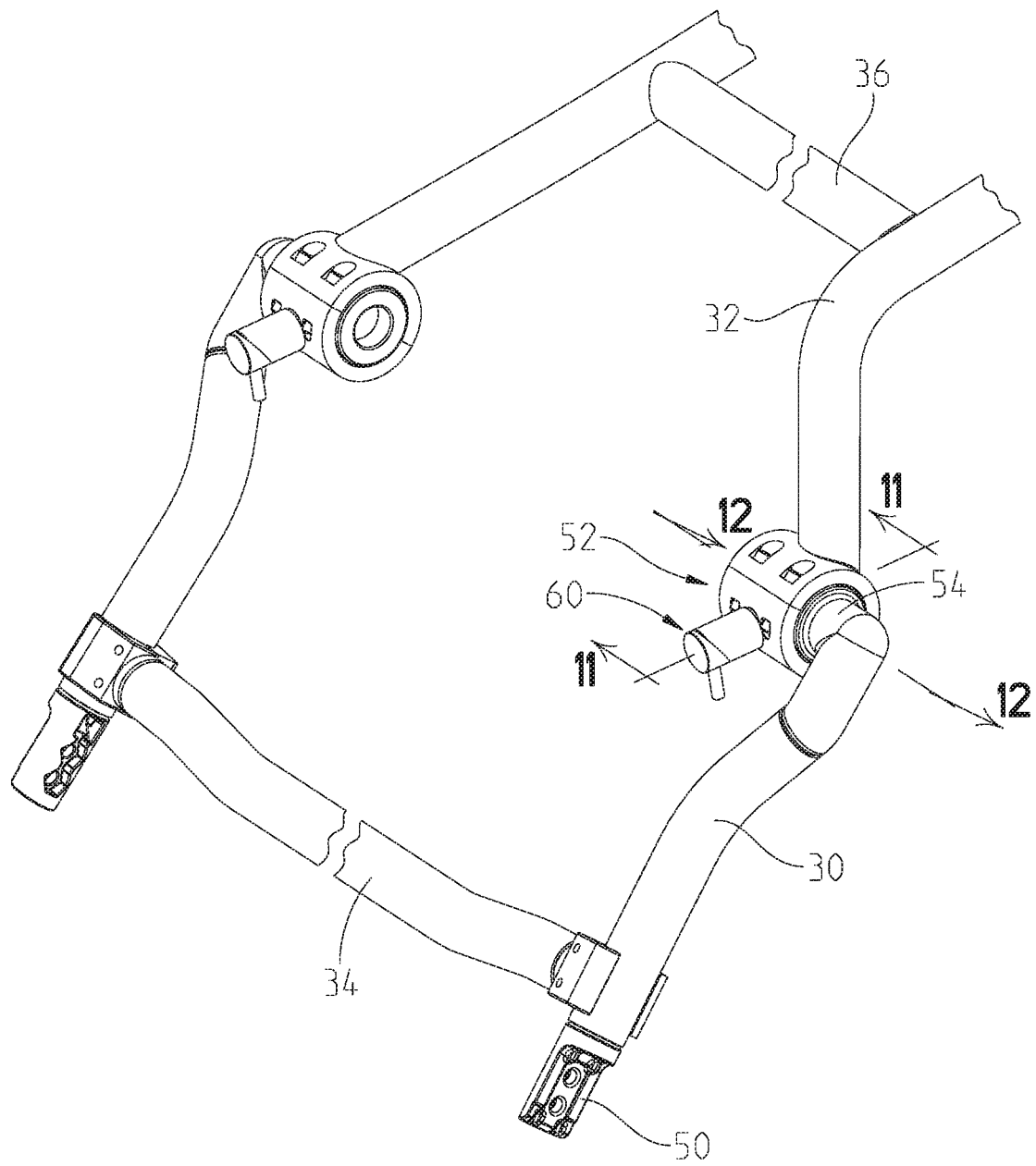
FIG. 9 is a left front perspective view of a front portion of the upper frame assembly of FIG. 8.

Upper frame assembly 10 is configured rotate between an upright position, as shown in FIG. 8, and a lowered position (not shown). More particularly, upper frame member 10 may be rotated to the lowered position during transport of vehicle 2. For example, if vehicle 2 is transported on an aircraft carrier, a watercraft, a cargo aircraft, a truck, or a trailer, upper frame member 10 may be rotated to the lowered position such that front and rear portions 26, 28 may rotate towards a hood of vehicle 2 to decrease the overall height of vehicle 2 during transport. Alternatively, front and rear portions 26, 28 may rotate rearwardly toward cargo area 14. In one embodiment, the height of vehicle 2 when upper frame assembly 10 is in the lowered position may be less than 60 inches. Additional information about the upright and lowered positions of upper frame assembly 10 is disclosed herein and in U.S. Pat. No. 8,998,253, issued on Apr. 7, 2015, the complete disclosure of which is expressly incorporated by reference herein.

As shown in FIGS. 8-14, front portion 26 of upper frame assembly 10 includes upstanding members 30 and longitudinally-extending members 32. Upstanding members 30 may be coupled together through a front cross-member 34 and longitudinally-extending members 32 may be coupled together by at least one brace 36 and a rear cross-member 38.

Figure 2:
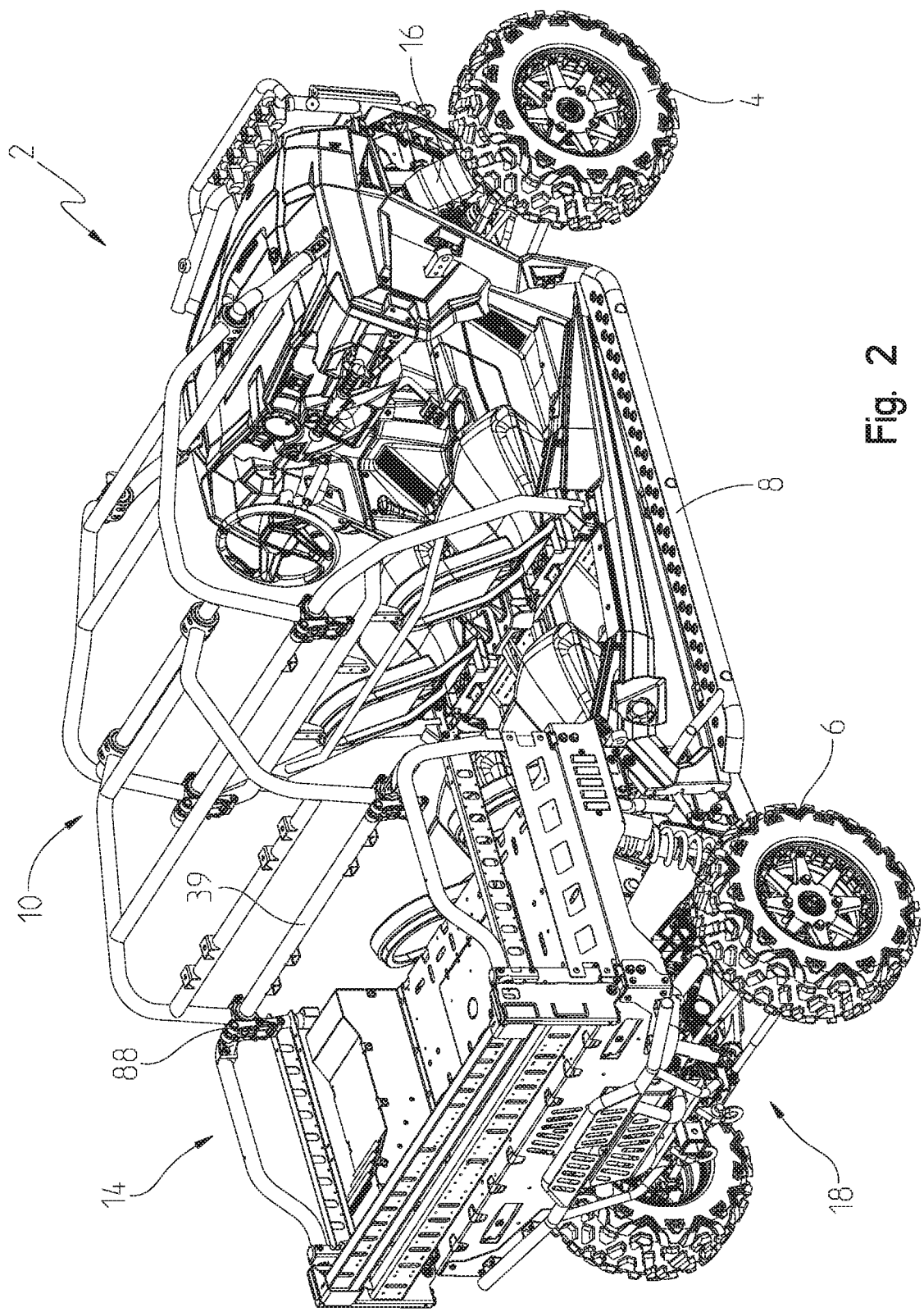
FIG. 2 is a right rear perspective view of the vehicle of FIG. 1.

As shown in FIG. 8, longitudinally-extending members 32 may be coupled to an intermediate member 40 having at least one brace 42 and an upper cross-member 43. Additionally, longitudinally-extending members 32 are coupled to rear portion 28 of upper frame assembly 10 through rear cross-member 38. As shown in FIG. 8, rear portion 28 includes upstanding members 44 and longitudinally-extending members 46. In one embodiment, upstanding members 44 are coupled together with a cross-member 48 and longitudinally-extending members 46 are coupled together by at least one brace 49. The forward extents of longitudinally-extending members 46 are pivotably coupled to rear cross-member 38 through pivot couplers 89 and the rearward extents of longitudinally-extending members 46 include latch assemblies 88 for coupling to a cross-member 39 of cargo area 14, as shown in FIG. 2. Also, the rearward extent of longitudinally-extending members 32 of front portion 26 includes latch assemblies 88 for coupling to upper cross-member 43 of intermediate member 40. Additional details of latch assemblies 88, pivot couplers 89, and upper frame assembly 10 may be disclosed further in U.S. Pat. No. 8,998,253, issued on Apr. 7, 2015, 09-25274.02P), the complete disclosure of which is expressly incorporated by reference herein.

Referring to FIGS. 8-14, each upstanding member 30 of front portion 26 has a lower end defined by couplers 50 which are configured to couple with lower frame assembly 8. Additionally, an upper end of each upstanding member 30 is coupled to longitudinally-extending members 32 with pivot members 52.

Figure 10:
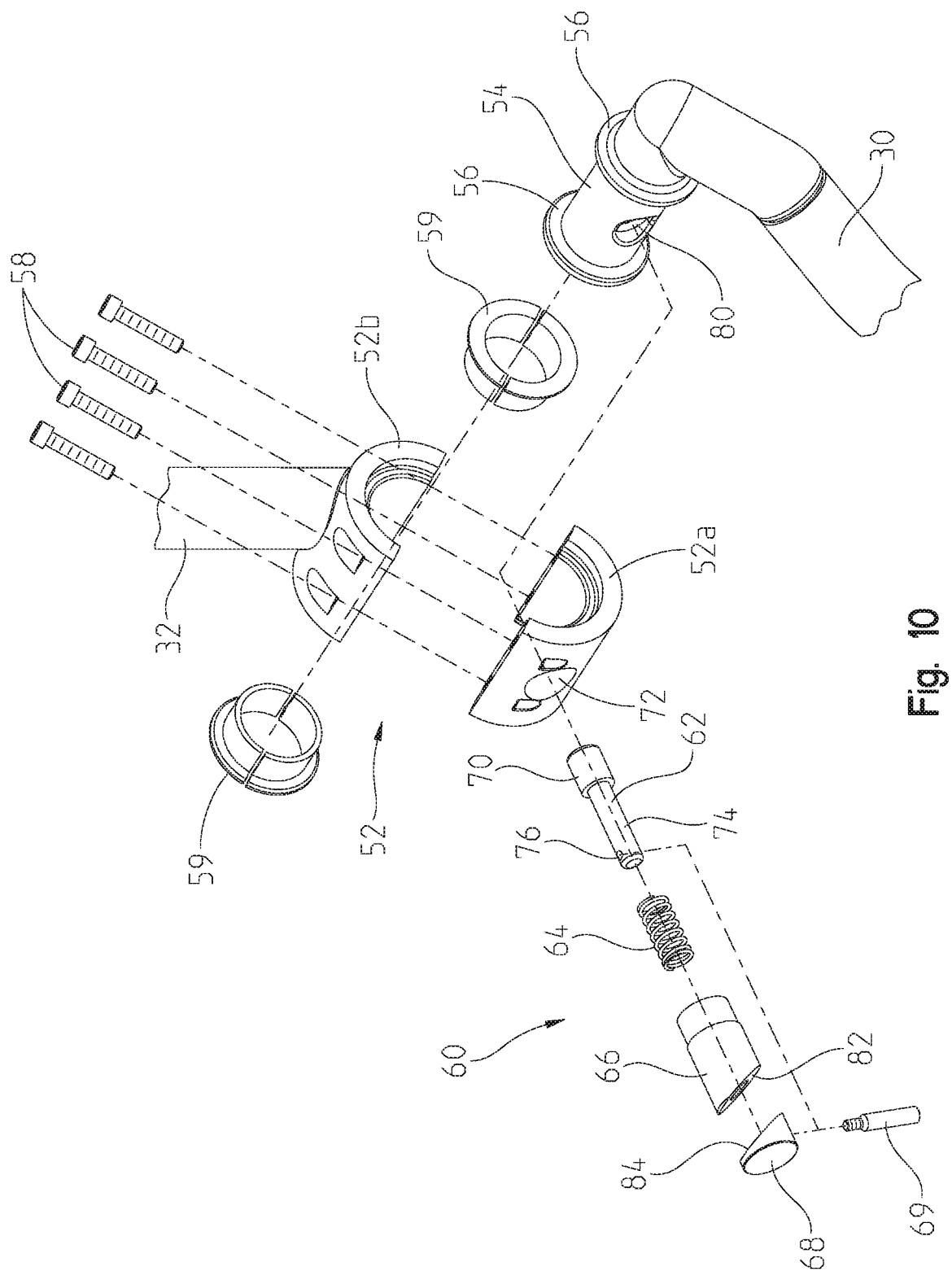
FIG. 10 is an exploded view of a pivot member of the front portion of FIG. 9.
Figure 11:
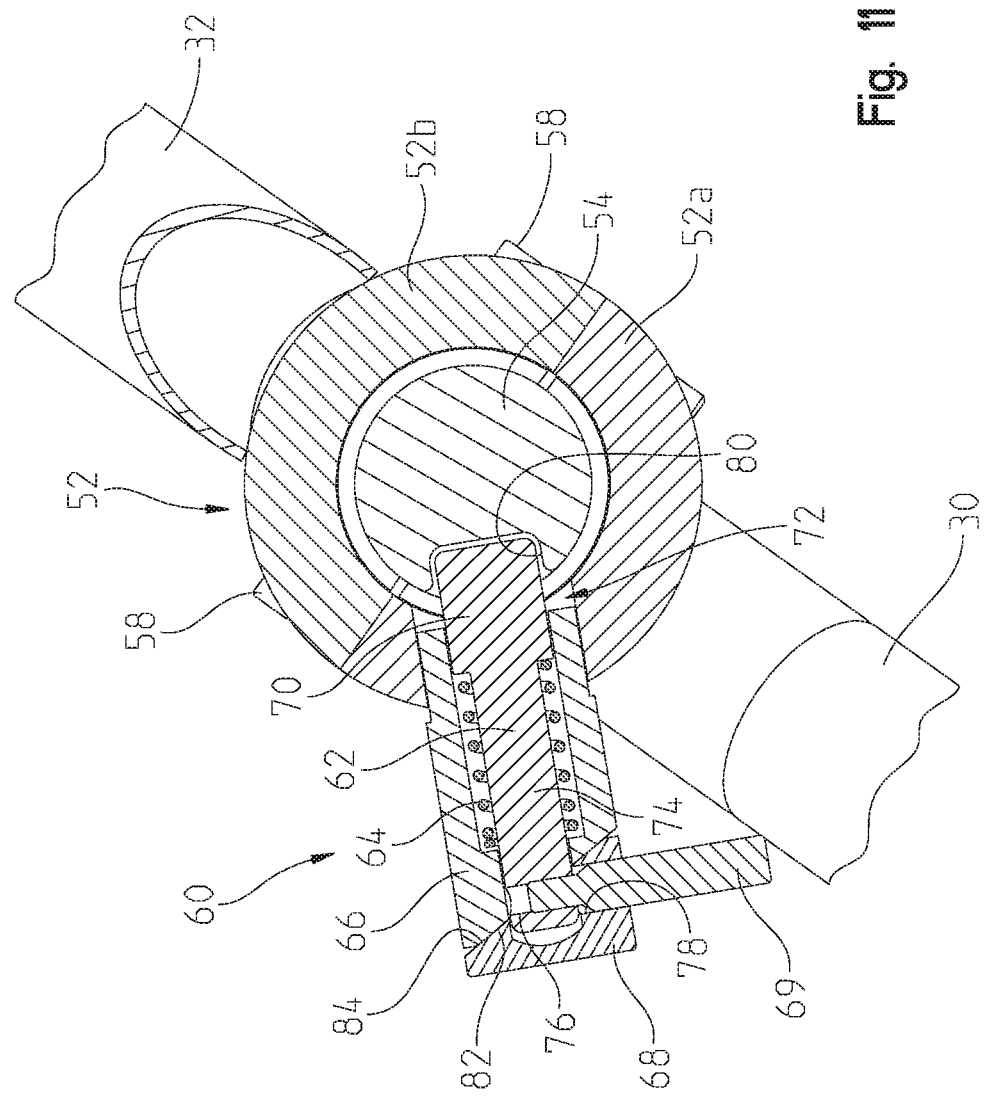
FIG. 11 is a cross-sectional view of the pivot member of FIG. 10, taken along line 11-11 of FIG. 9.
Figure 12:
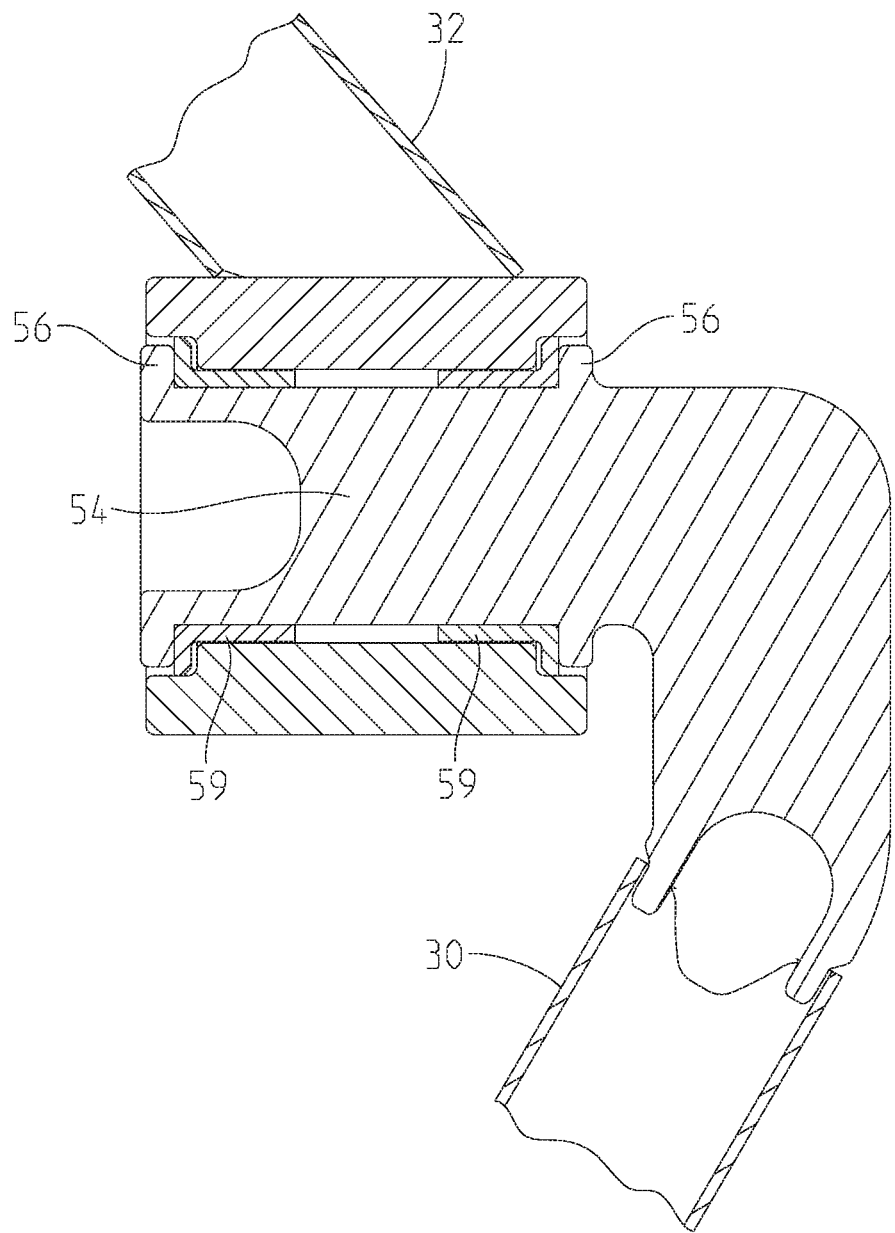
FIG. 12 is a further cross-sectional view of the pivot member of FIG. 10, taken along line 12-12 of FIG. 9.
Figure 13:
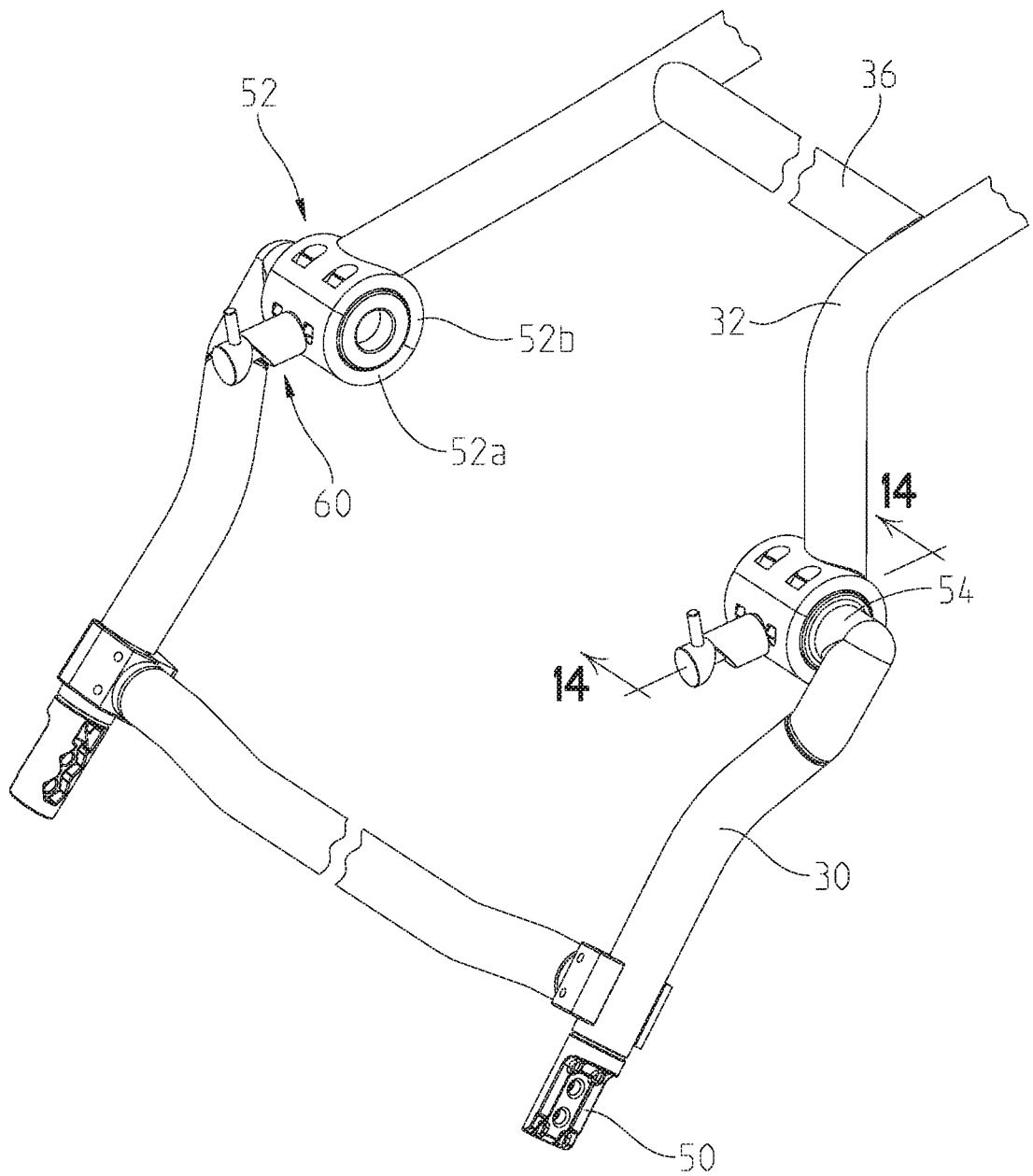
FIG. 13 is a left front perspective view of the front portion of the upper frame assembly and the pivot member of FIG. 9 with the pivot member positioned in a released configuration.

As shown in FIGS. 8-14, pivot members 52 are coupled to forward ends of longitudinally-extending members 32 and to lateral posts 54 of upstanding members 30. Posts 54 cantilever or otherwise extend from upstanding members 30 such that posts 54 are not coupled to each other. As such, front portion 26 of upper frame assembly 10 does not include a cross-member positioned between pivot members 52 which increases the operator's line of sight when operating vehicle 2. Illustratively, posts 54 also may be received within a portion of upstanding members 30 and welded, threaded, or otherwise coupled to upstanding member 30, as shown in FIG. 12. Alternatively, posts 54 may be integrally formed with upstanding members 30.

Referring still to FIGS. 8-14, pivot members 52 include a first portion 52a and a second portion 52b. Illustratively, second portion 52b is coupled to longitudinally-extending members 32 and, in one embodiment, second portion 52b is integrally formed with the forward ends of longitudinally-extending members 32. First and second portions 52a, 52b are positioned on post 54 intermediate flanges 56 of post 54 and bushings 59 are positioned between post 54 and first and second portions 52a, 52b. Flanges 56 maintain the lateral position of pivot member 52 on post 54 and bushings 59 allow pivot member 52 to rotate about post 54 when moving upper frame assembly 10 between the upright and lowered positions, as disclosed further herein. First and second portions 52a, 52b are removably coupled together with at least one fastener 58 about posts 54 of upstanding members 30.

As shown in FIGS. 10 and 11, each pivot member 52 also includes a pin assembly 60 to maintain the position of upper frame assembly 10, as disclosed further herein. Pin assembly 60 includes a pin plunger 62, a tension member, illustratively a spring 64, a housing 66, an outer cover 68, and a lever 69. In one embodiment, housing 66 has an angled surface 82 configured to contact an angled surface 84 of outer cover 68. Pin plunger 62 includes a rearward portion 70 which is received within a recess 72 of first portion 52a of pivot member 52 and within a recess 80 of post 54. Additionally, pin plunger 62 includes a forward portion 74 which includes an aperture 76. Forward portion 74 of pin plunger 62 is received within spring 64, housing 66, and outer cover 68 to receive an upper portion of lever 69 through aperture 76. More particularly, outer cover 68 includes an aperture 78 and lever 69 extends into apertures 76, 78 to couple together pin plunger 62, housing 66, and outer cover 68.

Figure 14:
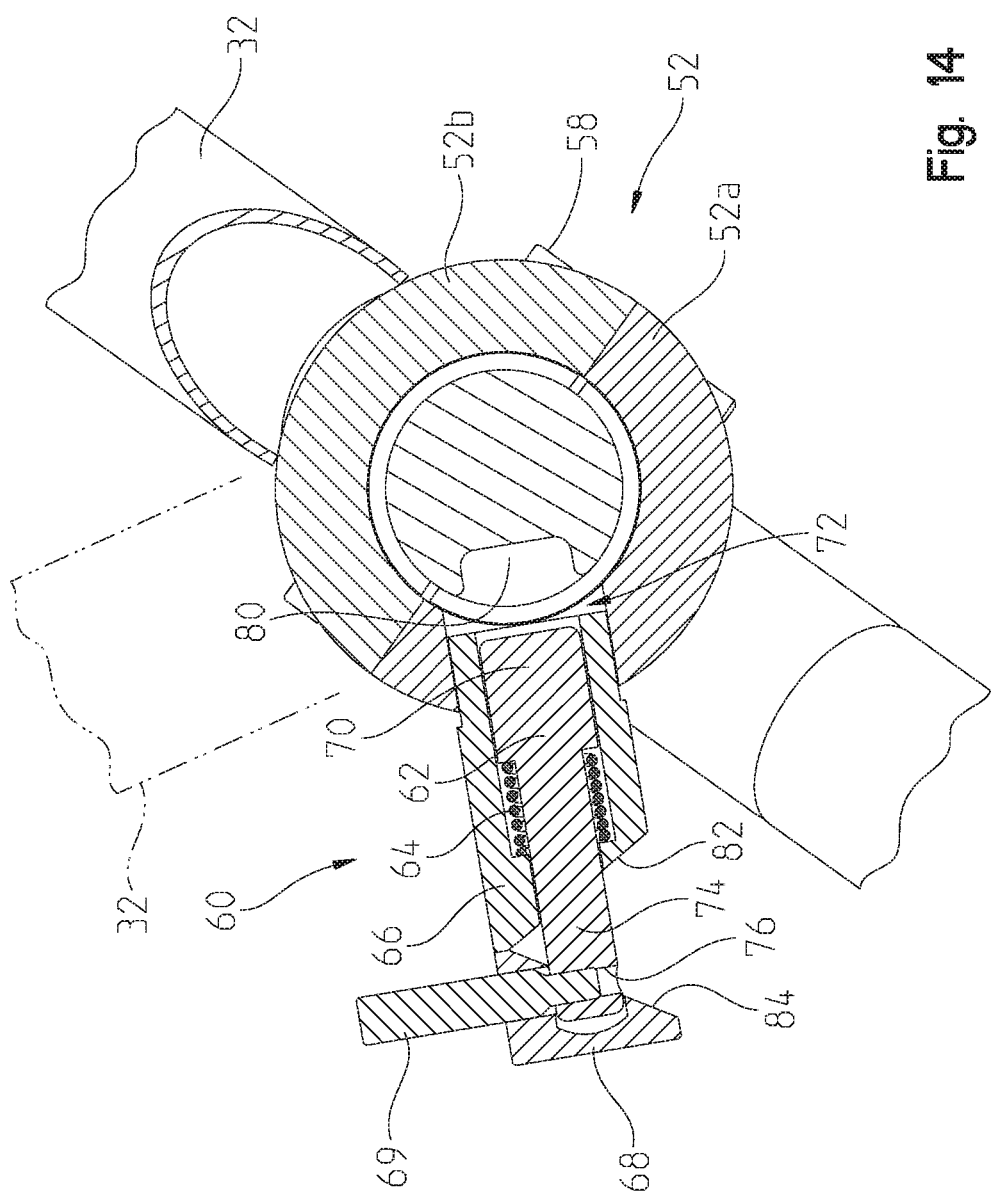
FIG. 14 is a cross-sectional view of the pivot member of FIG. 13, taken along line 14-14 of FIG. 13.

Because of spring 64, pin assembly 60 biases pin plunger 62 within recess 80 of post 54 such that upper frame assembly 10 is maintained in the upright position (FIG. 1-8). More particularly, by positioning at least a portion of rearward portion 70 of pin plunger 62 within recess 80 of post 54, pin plunger 62 prevents rotation of pivot member 52 about post 54 to maintain upper frame assembly 10 in the upright position. However, when it is desired to move upper frame assembly 10 to the lowered position, for example during transport of vehicle 2, lever 69 may be pulled in the forward direction or rotated approximately 180° to the released position shown in FIGS. 13 and 14, which pulls pin plunger 62 and outer cover 68 in the forward direction to move rearward portion 70 of pin plunger 62 out of recess 80 of post 54. More particularly, when moving to the released position, outer cover 68 and lever 69 may be rotated 180° relative to housing 66 such that angled surfaces 82, 84 are angled away from each other, rather than abutting each other when pin assembly 60 in the locked position shown in FIGS. 8-11. When pin plunger 62 is rotated 180°, angled surfaces 82, 84 rotate against each other until lever 69 extends upwardly. This rotation causes spring 64 to compress within housing 66 and rearward portion 70 of pin plunger 62 moves forwardly within housing 66. By moving rearward portion 70 of pin plunger 62 out of recess 80 of post 54, pivot member 52 can rotate about post 54 to move upper frame assembly 10 in a counter-clockwise direction to the lowered position, as shown in FIG. 14.

In operation, when moving upper frame assembly 10 to the lowered position, latch assemblies 88 on upstanding members 44 are released from cross-member 39 (FIG. 2) of cargo area 14 and latch assemblies 88 on longitudinally-extending members 32 are released from upper cross-member 43. Rear portion 28 of upper frame assembly 10 then rotates, via pivot couplers 89, in a clockwise direction about rear cross-member 38 to extend along an underside of front portion 26. In one embodiment, pivot couplers 89 may be replaced with pivot members 52 which include pin assembly 60. When pin assemblies 60 are actuated to release pin plunger 62 from post 54 (e.g., when lever 69 is rotated 180° such that pin plunger 62 and outer cover 68 move in a forward direction to compress spring 64), front and rear portions 26, 28 then rotate together in a counter-clockwise direction to allow front and rear portions 26, 28 to rotate forward of operator area 20 and rest on the hood of vehicle 2. By moving front and rear portions 26, 28 of upper frame assembly 10 to the lowered position on the hood of vehicle 2, the overall height of vehicle 2 is reduced to facilitate transportation of vehicle 2. It may be appreciated that tools are not required to actuate pin assemblies 60 and/or move upper frame assembly 10 between the upright and lowered positions. Additional details of the operation of upper frame assembly 10 may be disclosed in U.S. Pat. No. 8,998,253, issued on Apr. 7, 2015, the complete disclosure of which is expressly incorporated by reference herein. Additionally, upper frame assembly 10 may include only front portion 26 if vehicle 2 includes only front seats 22, as disclosed in U.S. Pat. No. 8,998,253, issued on Apr. 7, 2015, the complete disclosure of which is expressly incorporated by reference herein.

In one embodiment, lever 69 is configured to extend upwardly from outer cover 68 when in the locked position to extend away from the operator's line of sight. Alternatively, pin assembly 60 may be positioned anywhere along the circumference of pivot member 52 depending on the operator's preference for line of sight and operating pin assembly 60.

Figure 15:
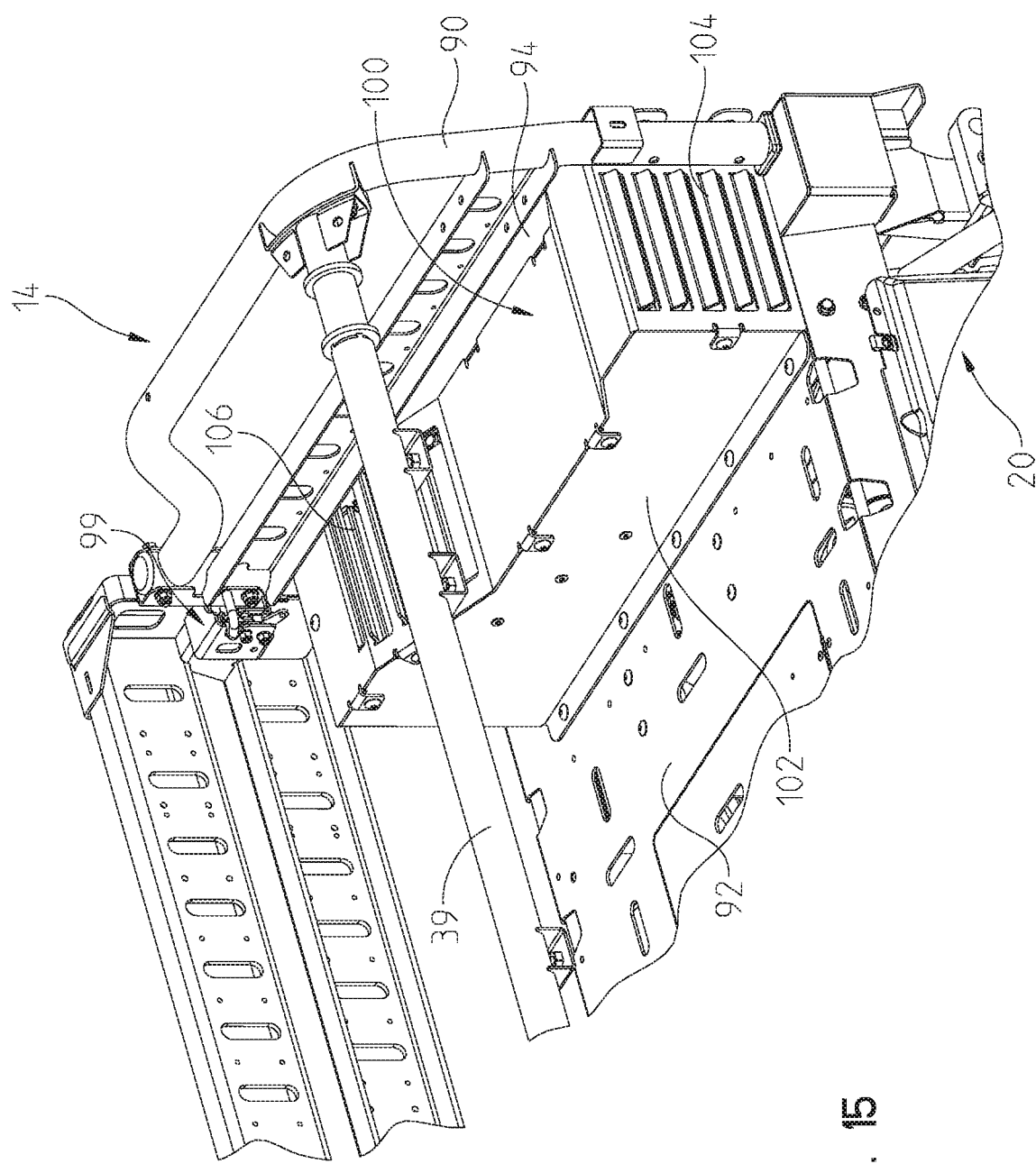
FIG. 15 is a right front perspective view of a cargo area of the vehicle of FIG. 1, including an air intake assembly.

Referring to FIGS. 15-20, cargo area 14 is generally positioned rearward of upper frame assembly 10 and operator area 20. Cargo area 14 includes lateral frame members 90 which are coupled to cross-member 39. Additionally, cargo area 14 includes a floor 92, side walls 94 (FIG. 3), and a tail gate 96 which is configured to pivot about point 98 (FIG. 3) and is moved between a lowered position and an upright position (FIG. 15) by a latch assembly 99 (FIG. 15). Cargo area 14 is configured to support cargo, passengers, and any other item on vehicle 2.

Figure 16:
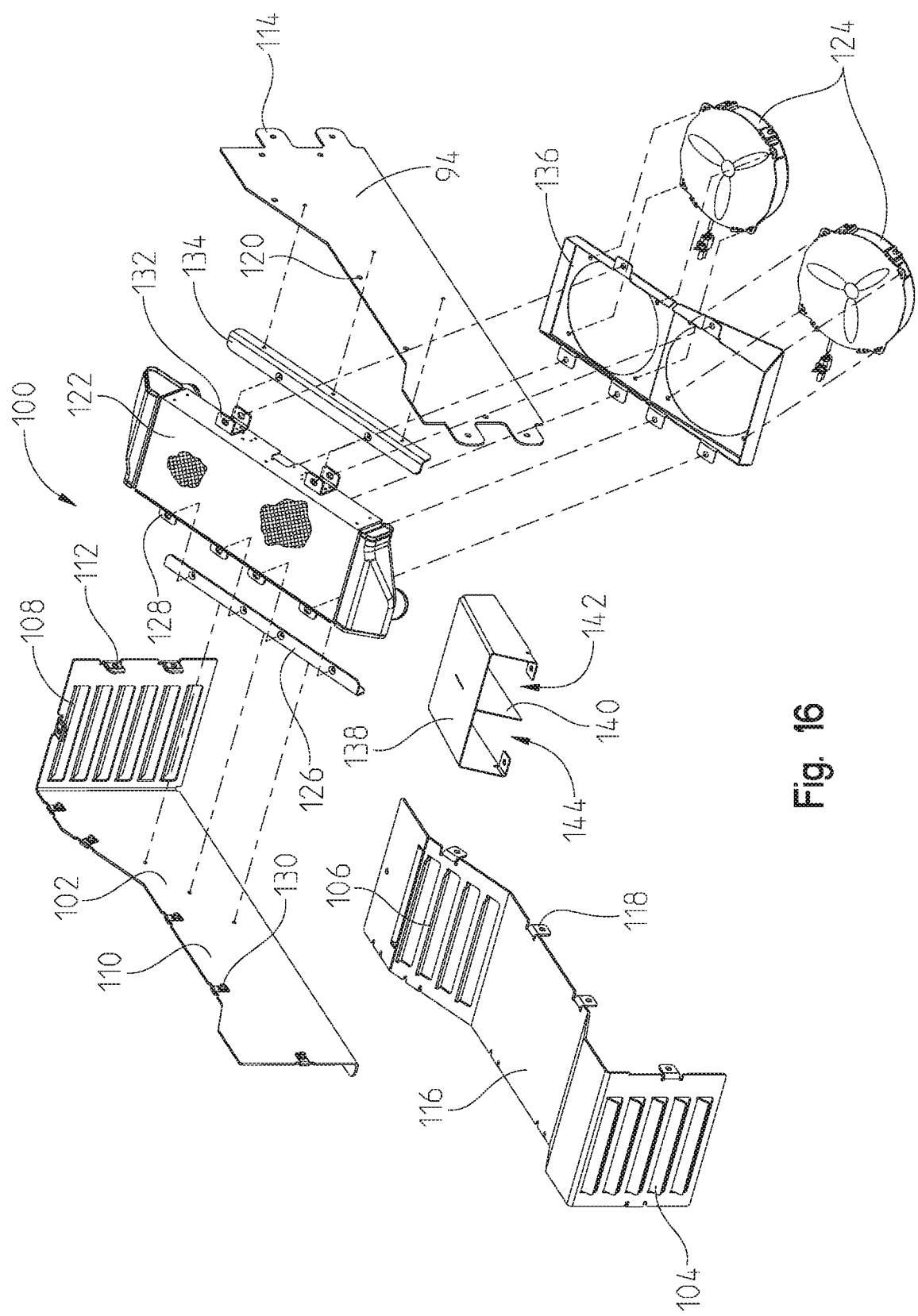
FIG. 16 is an exploded view of the air intake assembly of FIG. 15.
Figure 17:
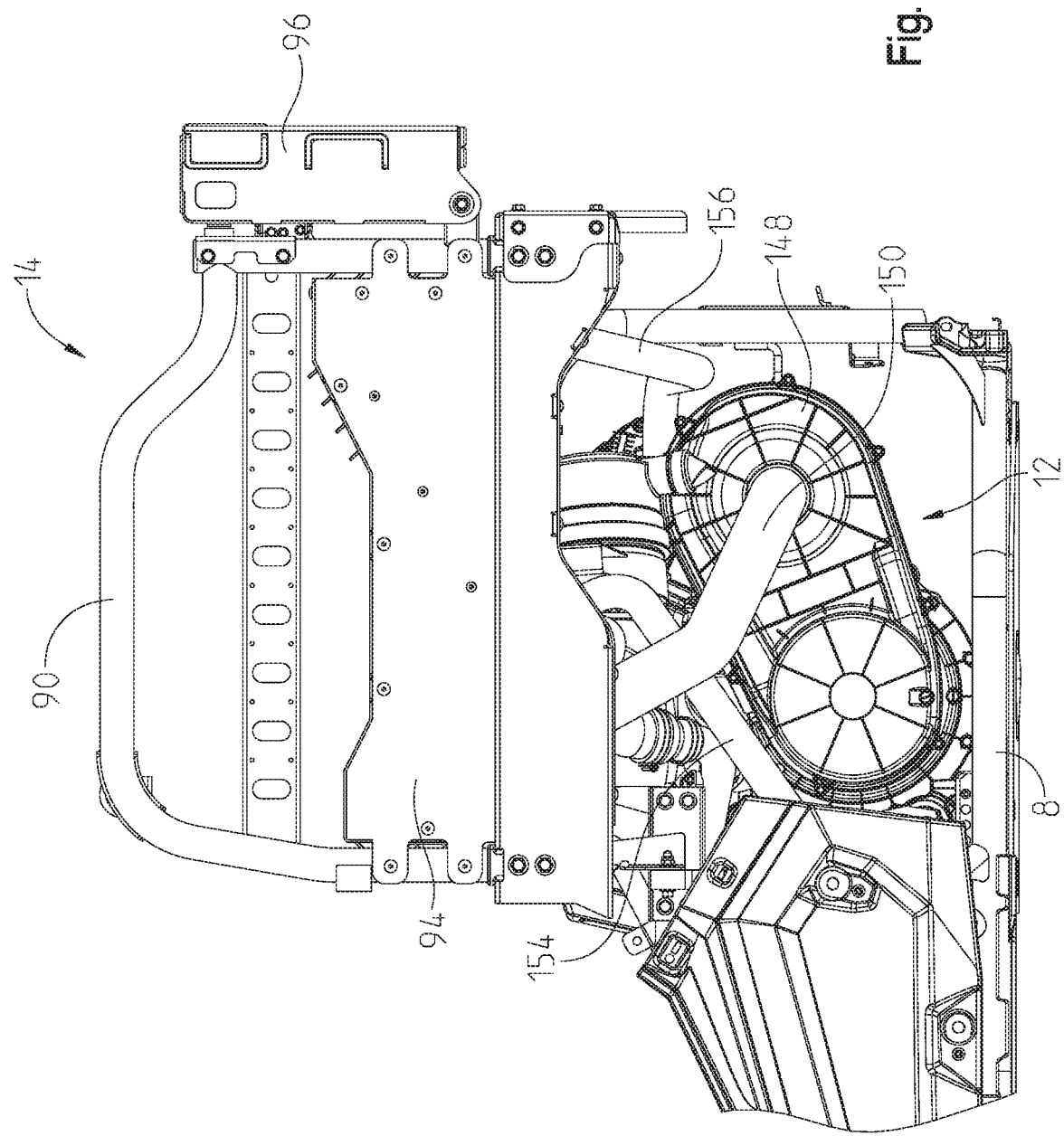
FIG. 17 is a left side view of a rear portion of the vehicle of FIG. 1, illustrating the air intake assembly of FIG. 15 and a portion of a powertrain assembly of the vehicle of FIG. 1.

Additionally, and referring to FIG. 16, cargo area 14 supports an air intake assembly 100 for vehicle 2. As shown, air intake assembly 100 is positioned along a side of cargo area 14, illustratively the left side, such that the center portion and right side of cargo area 14 remains available for supporting cargo, passengers, and/or other items (e.g., stretchers or gurneys). Additionally, at this position, air intake assembly 100 is positioned adjacent powertrain assembly 12, rather than at the front portion of vehicle 2, which decreases the length of hoses or conduits required to supply air to portions of powertrain assembly 12, as disclosed further herein.

Air intake assembly 100 is positioned within a housing 102 which is coupled to left side wall 94. Housing 102 includes a forward vent 104, an upper vent 106, and a rearward vent 108, as disclosed further herein. More particularly, housing 102 includes an inner member 110 coupled to left side wall 94 through brackets 112 which abut tabs 114 of left side wall 94. Inner member 110 of housing 102 includes rearward vent 108. Additionally, housing 102 includes an upper member 116 which includes forward vent 104 and upper vent 106. Upper member 116 is coupled to left side wall 94 with brackets 118 which abut upper apertures 120 of left side wall 94.

Referring still to FIG. 16, air intake assembly 100 includes a heat exchanger 122, such as an air-to-air intercooler, a charge air cooler, or a liquid-to-air intercooler, and at least one fan 124. Illustratively, air intake assembly 100 includes two fans 124, however, air intake assembly 100 may have any number of fans 124 to accommodate the intake air and/or cooling air required for powertrain assembly 12. Heat exchanger 122 is coupled to inner member 110 of housing 102 with a bracket 126 which is removably coupled to tabs 128 on heat exchanger 122 with fasteners (not shown) and to fasteners 130 on inner member 110 of housing 102. Additionally, heat exchanger 122 includes brackets 132 which couple to a support member 134 for coupling to left side wall 94 of cargo area 14. Support member 134 and brackets 132 also couple with a frame member 136 for fans 124.

Figure 18:
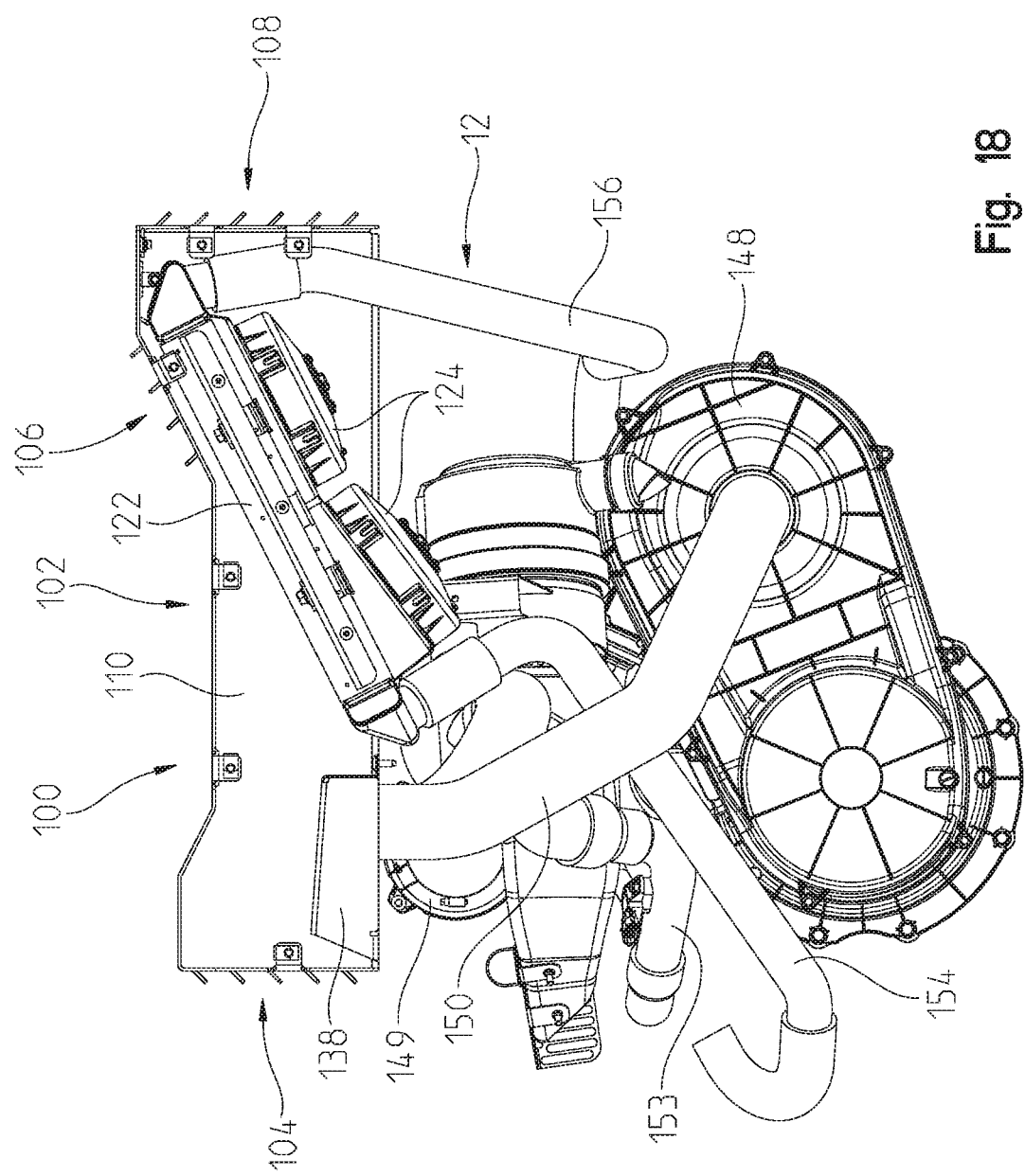
FIG. 18 is a left side view of the air intake assembly and powertrain assembly of FIG. 17.
Figure 19:
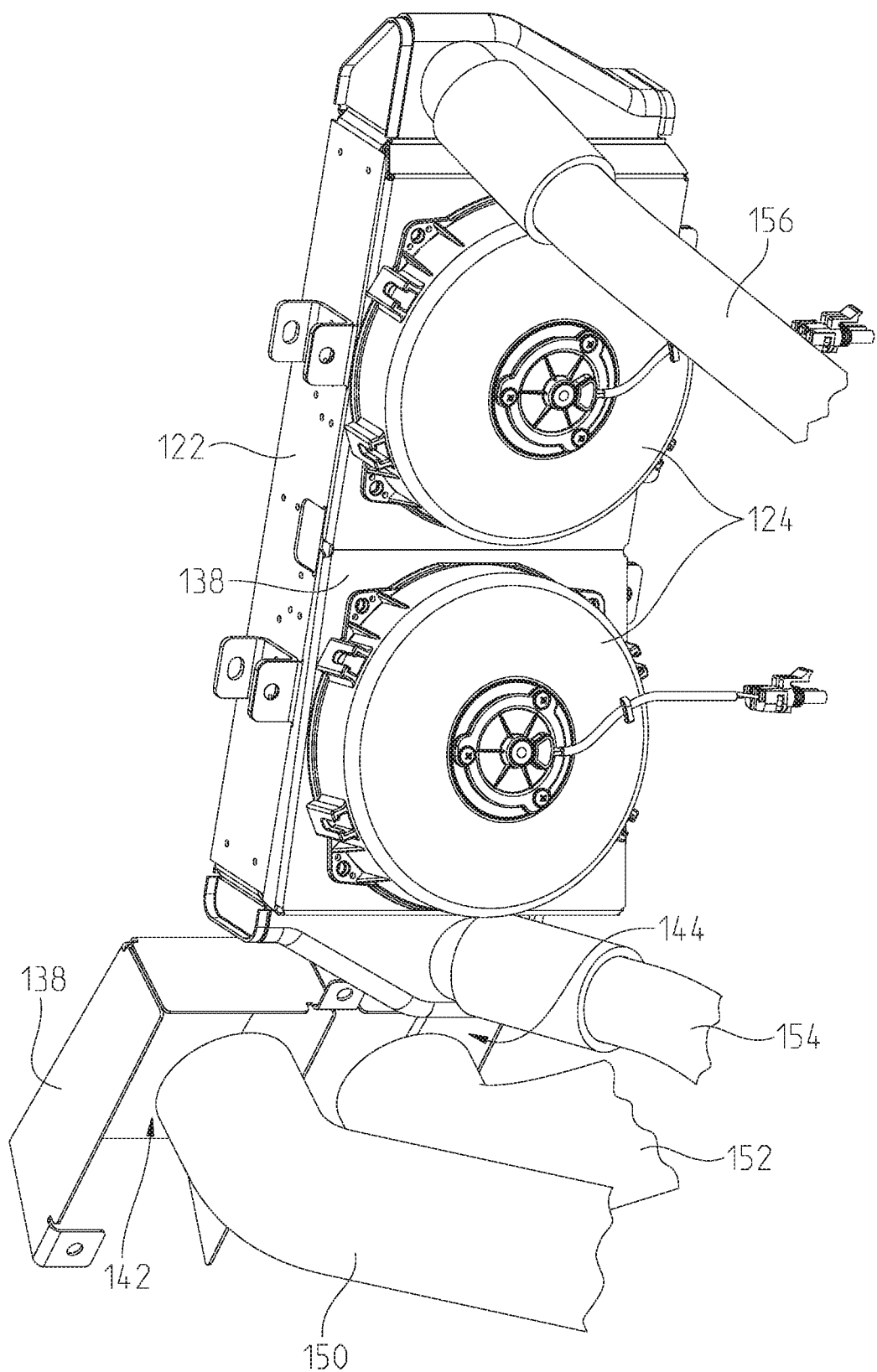
FIG. 19 is a left rear perspective view of an underside of the air intake assembly of FIG. 15.
Figure 20:
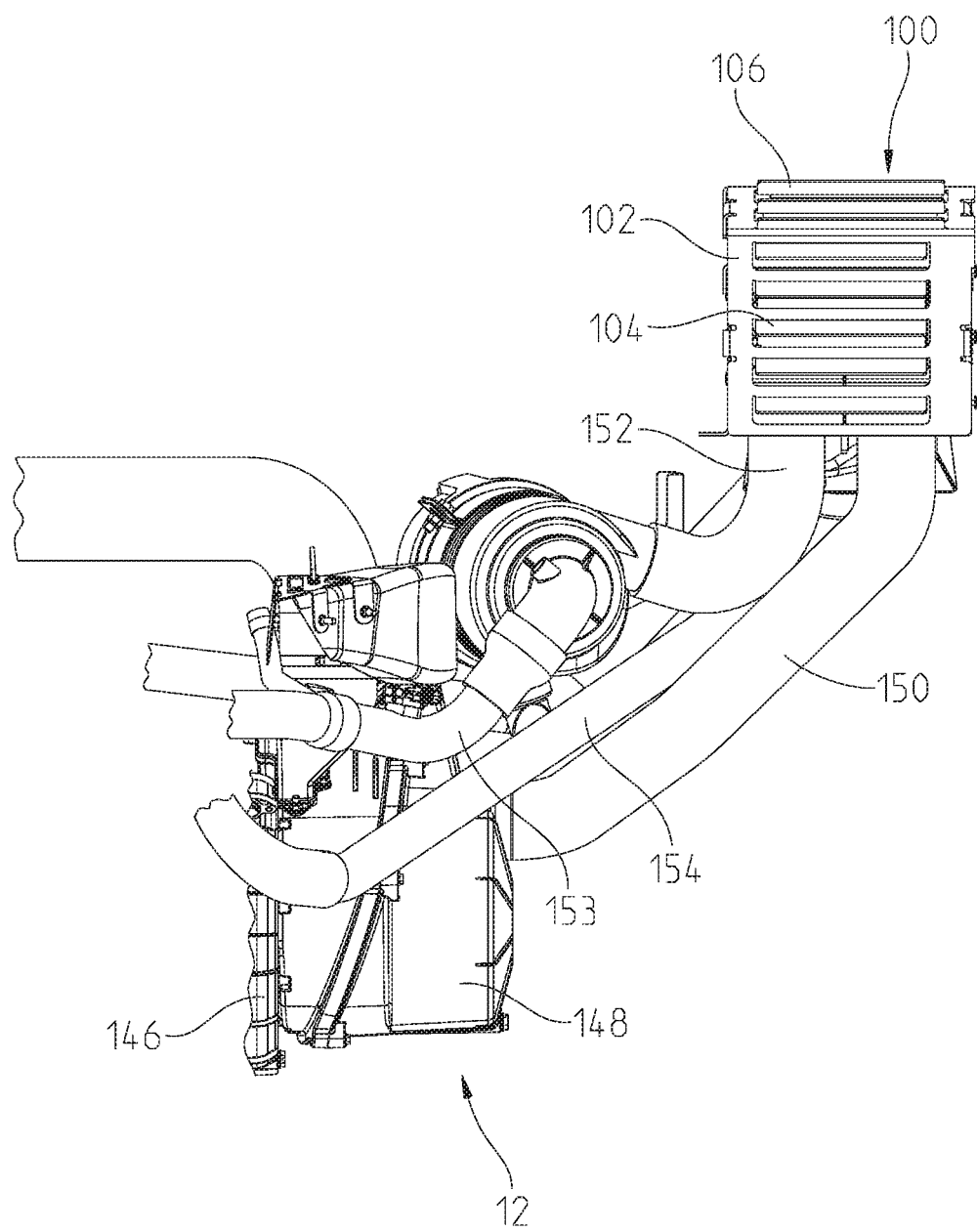
FIG. 20 is a front view of the air intake assembly and powertrain assembly of FIG. 18.

As shown in FIG. 16, air intake assembly 100 also includes a baffle 138 which includes a partition or wall 140 to divide baffle 138 into two or more air channels 142, 144. Illustratively, baffle 138 is positioned within housing 102 and is forward of heat exchanger 122 and fans 124, as shown in FIG. 18.

As shown in FIGS. 17-20, air intake assembly 100 is positioned generally above powertrain assembly 12 to provide intake air and/or cooling air to portions of powertrain assembly 12. Additionally, the aerodynamics of vehicle 2 create a low-pressure zone in cargo area 14 such that air intake assembly 100 is positioned within this low-pressure area to increase air flow to air intake assembly 100.

Air intake assembly 100 is fluidly coupled to CVT 148 to provide cooling air thereto and is fluidly coupled to turbocharger 149 to provide air thereto for cooling and/or combustion within engine 146 (FIG. 4). More particularly, air intake assembly 100 is configured to provide combustion air to engine 146 through turbocharger 149 and is configured for cooling at low speed and high-load operation of vehicle 2. Air intake assembly 100 includes a clutch intake conduit 150 extending between first air channel 142 and CVT 148 to provide cooling air to CVT 148. Air enters housing 102 through forward vent 104 and a portion of the air flowing through forward vent 104 flows into first air channel 142 of baffle 138 to provide ambient air to CVT 148. Air intake assembly 100 also includes a turbocharger intake conduit 152 (FIG. 19) extending between second air channel 144 and turbocharger 149 to provide ambient air to turbocharger 149 for combustion within engine 146 (FIG. 4). Air enters housing 102 through forward vent 104 and a portion of the air flowing through forward vent 104 flows into second air channel 144 of baffle 138 to provide air to turbocharger 149. The air from turbocharger 149 flows into a combustion chamber (not shown) of engine 146 through a conduit 153 (FIG. 18). Before the air within turbocharger conduit 152 enters turbocharger 149 and/or engine 146, the air may flow through a filter to remove particulate matter, debris, etc. therefrom. Additionally, turbocharger 149 may receive exhaust gases from engine 146. It may be appreciated that wall 140 of baffle 138 separates the air into two distinct flow paths for conduits 150, 152 such that air directed to CVT 148 through first air channel 142 is not scavenged from the air directed to turbocharger 149 through second air channel 144 or vice versa.

Air intake assembly 100 also includes an intake conduit 154 and an outlet conduit 156 for heat exchanger 122. Intake conduit 154 is configured to receive cooling fluid (e.g., oil, coolant, air, etc.) from turbocharger 149 which flows through heat exchanger 122 to decrease the temperature of the cooling fluid. More particularly, ambient air enters housing 102 through vents 104, 106 which is pulled through heat exchanger 122 by fans 124. As the cooler ambient air flows through heat exchanger 122, the temperature of the cooling fluid from engine 146 decreases and is recirculated to engine 146 through outlet conduit 156 for continued cooling of at least engine 146. Alternatively, in one embodiment, heat exchanger 122 may be configured to decrease the temperature of the air entering the combustion chamber of engine 146 from turbocharger 149 to increase the air density into the combustion chamber to allow more fuel to be injected therein, resulting in greater power output.

To increase the ambient air flow through heat exchanger 122, heat exchanger 122 and fans 124 are angled relative to floor 92 (FIG. 15) of cargo area 14 to increase the air flow through both forward vent 104 and upper vent 106. In one embodiment, heat exchanger 122 and fans 124 are angled 5-15°, and more particularly 10°, relative to floor 92. Alternatively, heat exchanger 122 may be angled more or less than fans 124 relative to floor 92. Additionally, in one embodiment, one of fans 124 has a different angle relative to floor 92 than the angle of the other fan 124. Due to the angle of fans 124 and positioning heat exchanger 122 in a low-pressure area of vehicle 2, the quantity of air flowing through heat exchanger 122 may be increased because the low pressure draft behind vehicle 2 "pulls" air rearwardly toward heat exchanger 122. Additionally, the angle of fans 124 allows the air exiting heat exchanger 122 to flow rearwardly out of vehicle 2 through rearward vent 108. As such, the hotter air from heat exchanger 122 is directed away from powertrain assembly 12 and other components of vehicle 2 by flowing rearwardly through vent 108 to prevent inadvertent heating of such components.

Figure 21:
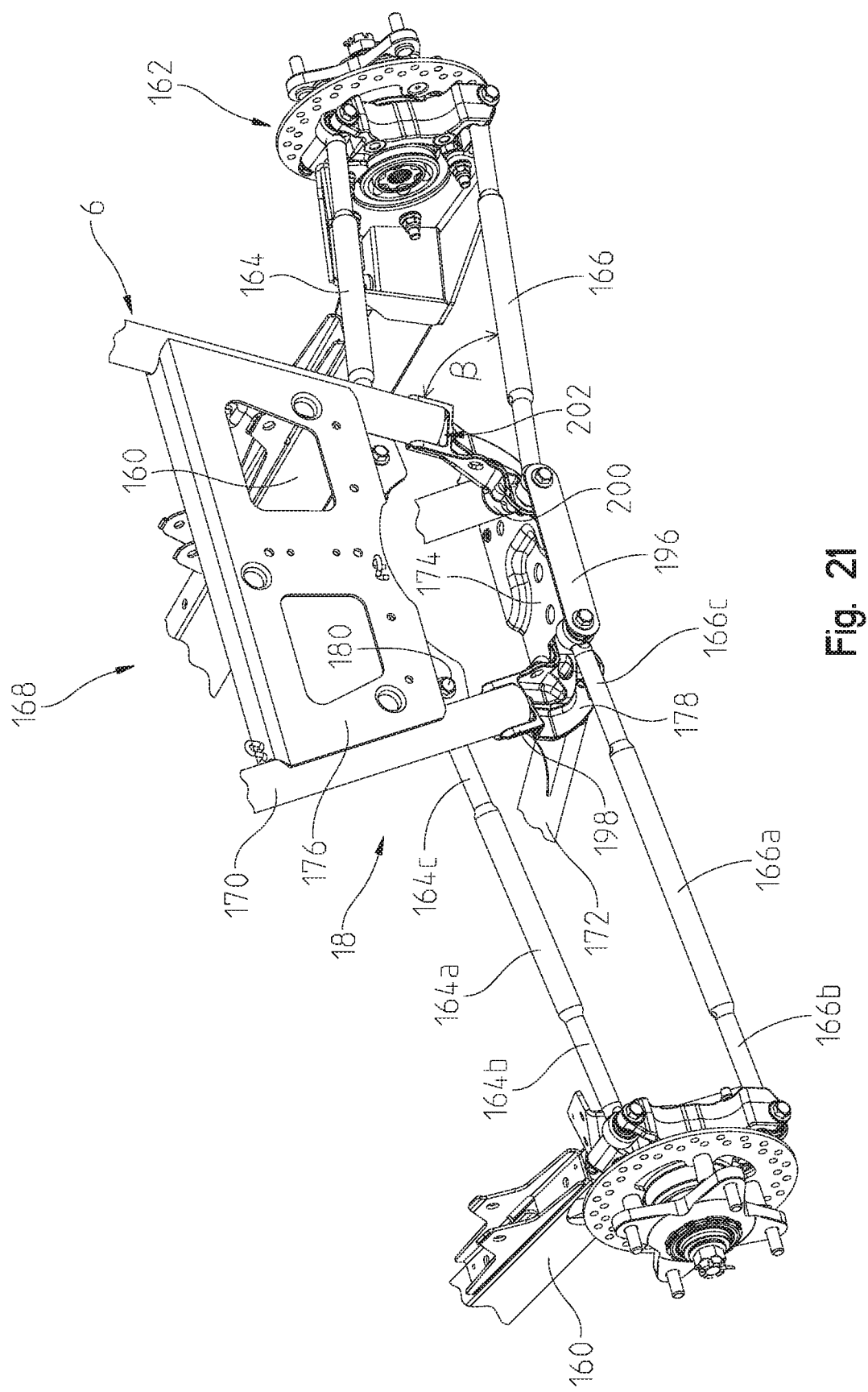
FIG. 21 is a left rear perspective view of a rear suspension assembly of the vehicle of FIG. 1.

Referring to FIGS. 21-26, rear suspension assembly 18 generally surrounds a portion of powertrain assembly 12. More particularly, rear suspension assembly 18 is positioned rearward and laterally outward of engine 146 and CVT 148. Illustratively, rear suspension assembly 18 includes trailing arms 160 operably coupled to a rear portion 168 of lower frame assembly 8 and a hub assembly 162 of rear ground-engaging members 6. Additionally, rear suspension assembly 18 also includes upper radius rods 164 and lower radius rods 166. Radius rods 164, 166 also are operably coupled to hub assembly 162 and lower frame assembly 8. As shown in FIG. 21, radius rods 164 include a first or center portion 164a, a second or outer portion 164b, and a third or inner portion 164c. Similarly, radius rods 166 include a first or center portion 166a, a second or outer portion 166, and a third or inner portion 166c. Portions 164a, 164b, 164c are coupled together, for example by welding. Similarly, portions 166a, 166b, 166c are coupled together, for example by welding. Portions 164a, 164b, 164c, 166a, 166b, 166c all may have the same length or may have different lengths to accommodate various geometries of rear suspension assembly 18 and/or sizes of vehicle 2. Additionally, portions 164a, 164b, 164c, 166a, 166b, 166c all may have the same diameter or may have different diameters such that portions 164b, 164c have a smaller diameter than portion 164a and/or portions 166b, 166c have a smaller diameter than portion 166a.

In one embodiment, bearings 186, 194 of radius rods 164, 166, respectively, may be comprised of a high-strength material which is forged and requires minimal machining. Similarly, the outer bearings of radius rods 164, 166 which are coupled to hub assembly 162 also may be comprised of high-strength material which is forged and requires minimal machining. Bearings 186, 196 may be coupled to third portions 164c, 166c, respectively, in any known manner (e.g., welding).

As compared to conventional radius rods which may be comprised of a solid diameter steel rod, the three-piece configuration of radius rods 164, 166 includes forged or machined ends to accommodate a spherical joint, which may decrease the weight and cost of radius rods 164, 166. For example, the weight of radius rods 164, 166 may be reduced by up to 50% compared to conventional radius rods while maintaining the buckling and bending strength of a conventional radius rod.

Figure 23:
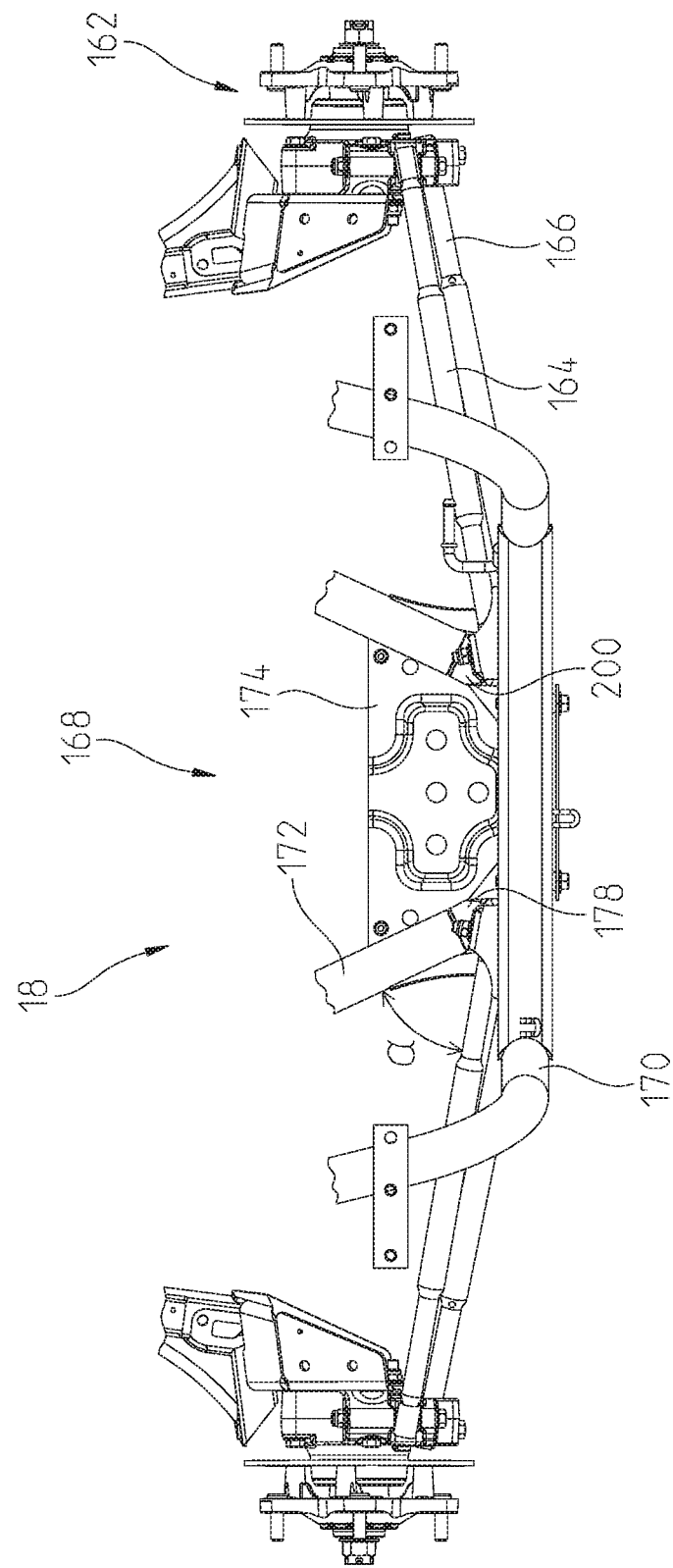
FIG. 23 is a top view of the rear suspension assembly of FIG. 22.
Figure 24:
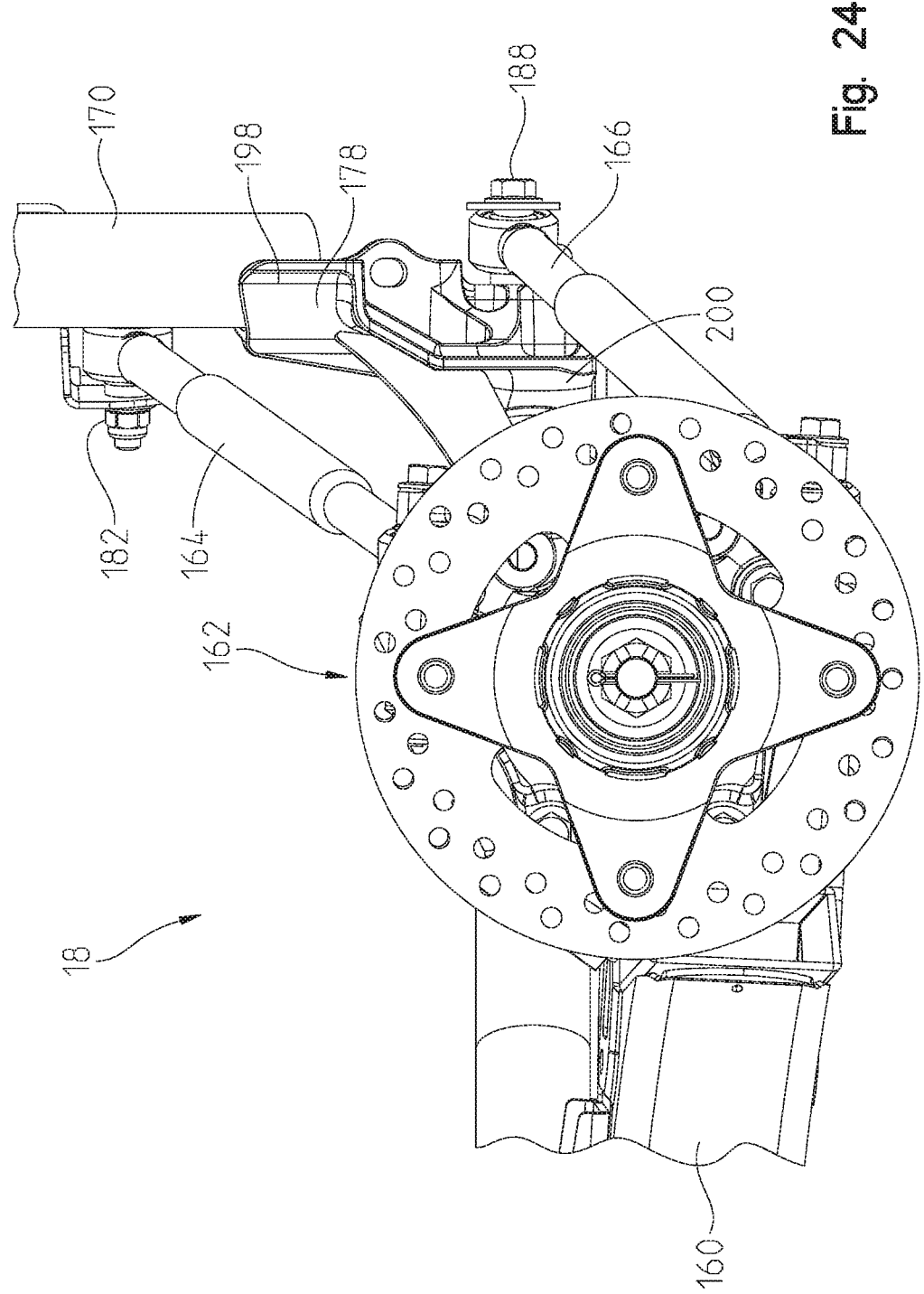
FIG. 24 is a left side view of the rear suspension assembly of FIG. 23.

As shown in FIG. 23, radius rods 164, 166 are angled forwardly such that the outer extents of radius rods 164, 166 are positioned forward of the inner extents thereof. In other words, second portions 164b, 166b are positioned forward of third portions 164c, 166c. As such, radius rods 164, 166 angle forwardly and away from the half shafts (not shown) which extend into hub assemblies 162 from the rear differential (not shown). In this way, radius rods 164, 166 are configured to pivot a maximum distance during operation of vehicle 2 without interference from the half shafts or a component of lower frame assembly 8. Additional details of rear suspension assembly 18 may be disclosed in U.S. patent application Ser. No. 14/051,700, filed on Oct. 11, 2013, the complete disclosure of which is expressly incorporated by reference herein.

Illustratively, rear portion 168 of lower frame assembly 8 includes upstanding members 170, longitudinally-extending members 172, a support plate 174, a rear brace 176, and a frame coupler 178. Support plate 174 may be configured to support a portion of powertrain assembly 12, such as a rear differential (not shown), and may be coupled to frame coupler 178 and/or longitudinally-extending members 172.

Additionally, brace 176 extends between upstanding members 170 and is coupled thereto with welds, adhesive, rivets, bolts, or mechanical fasteners. Upper radius rods 164 are coupled to brace 176 with fasteners 180, 182 which are received through an aperture 184 in brace 176 and through bearing 186 of upper radius rod 164. Illustratively, upper radius rods 164 are removably coupled to brace 176 forward of upstanding members 170 and forward of a portion of frame coupler 178. By positioning upper radius rods 164 forward of a portion of frame coupler 178 and upstanding members 170, upper radius rods 164 are configured to pivot in a vertical plane (not shown) a maximum distance during operation of vehicle 2 without any interference from lower frame assembly 8.

Figure 25:
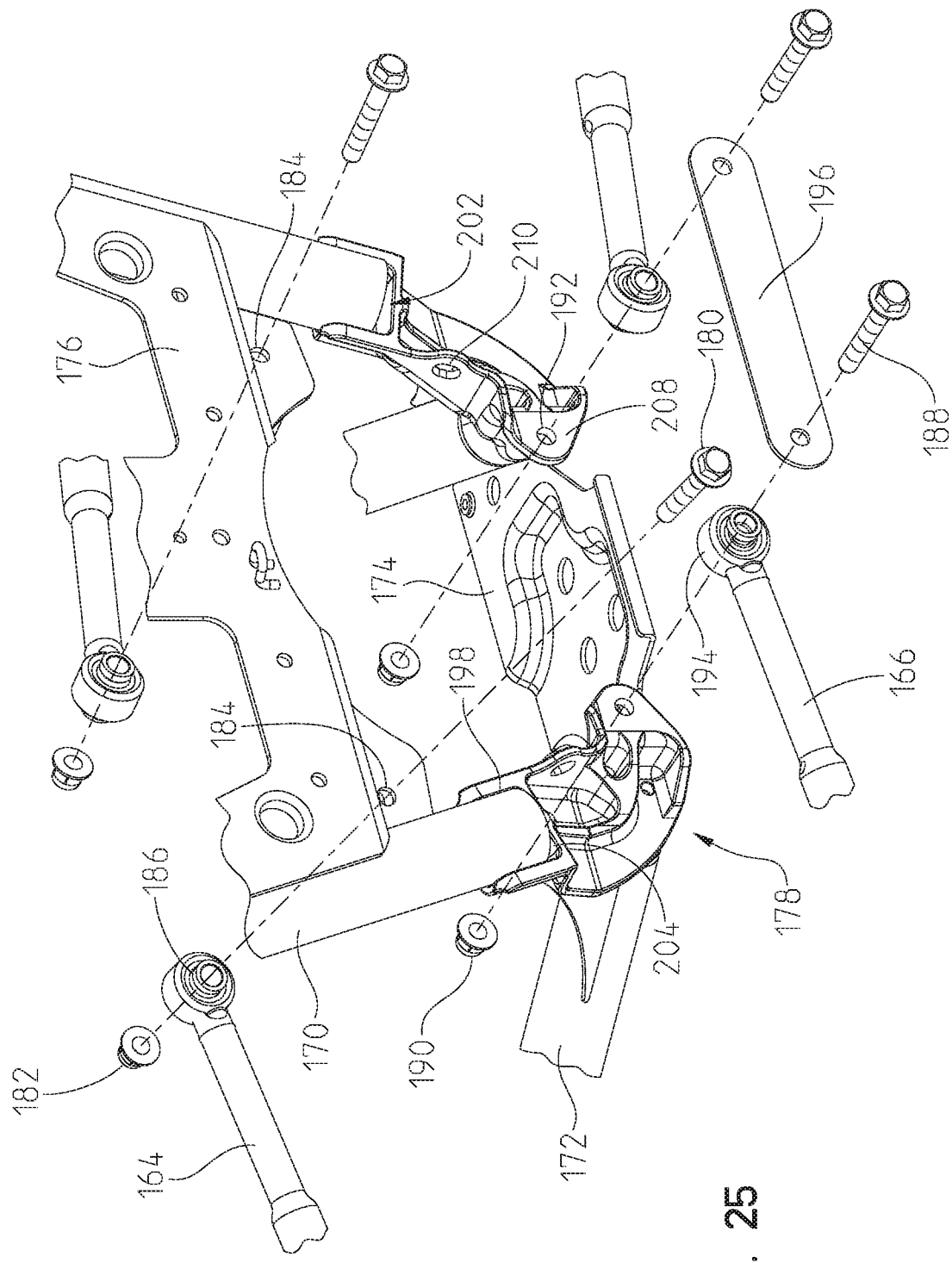
FIG. 25 is an exploded view of a portion of the rear suspension assembly of FIG. 21 and a rear frame portion of the vehicle of FIG. 1.
Figure 26:
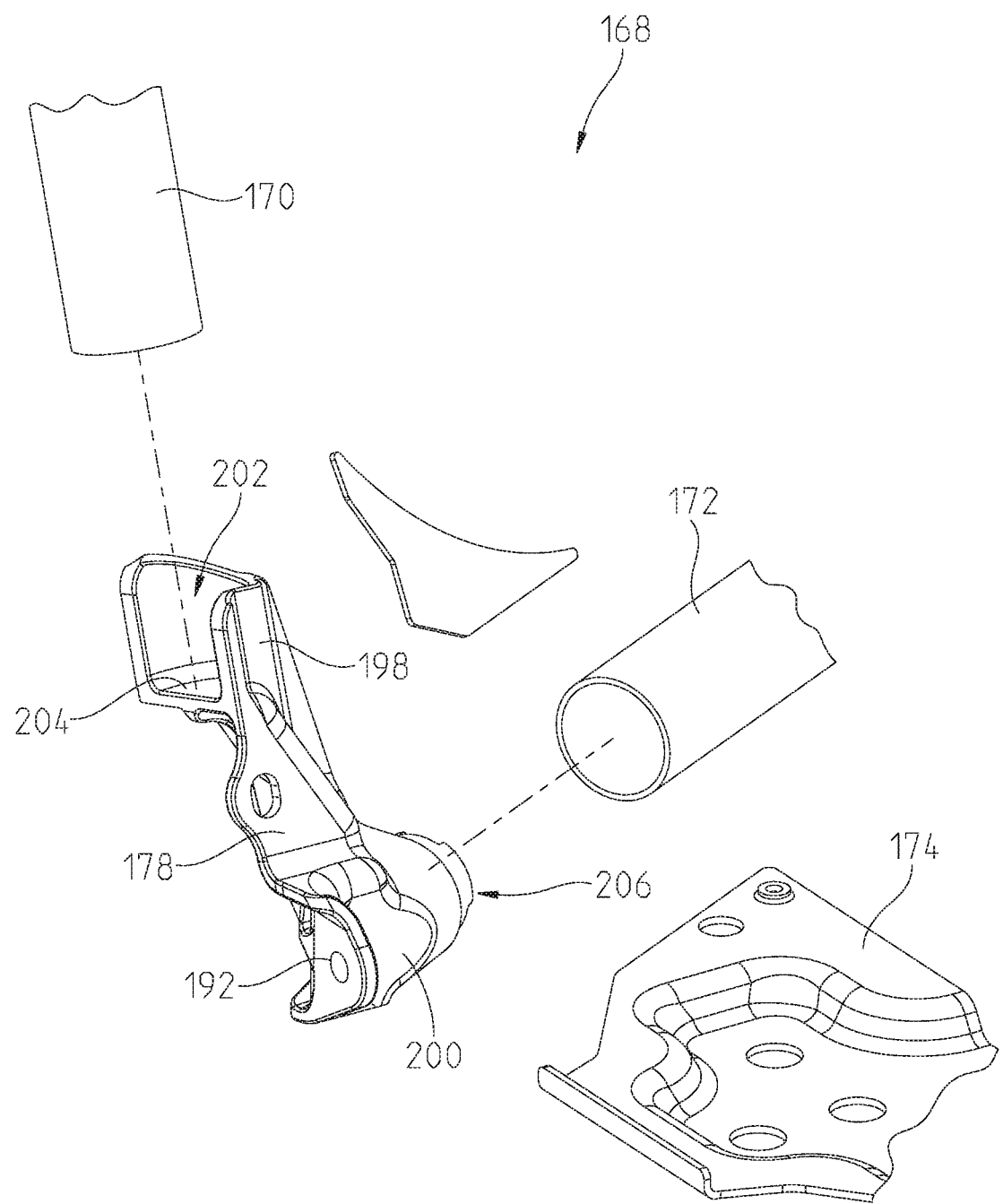
FIG. 26 is an exploded view of a frame coupler of the rear frame portion of FIG. 25.

Lower radius rods 166 are removably coupled to frame coupler 178 with fasteners 188, 190 which are received through an aperture 192 in frame coupler 178 and bearing 194 of lower radius rod 166. More particularly, bearing 194 is coupled to a rearward extent or surface 208 of frame coupler 178. Additionally, a mounting plate 196 is coupled to bearing 194 and lower frame assembly 8 with fasteners 188, 190. As shown in FIG. 25, bearing 194 is positioned intermediate rearward extent 208 of frame coupler 178 and mounting plate 196. By positioning lower radius rods 166 rearward of frame coupler 178, upstanding members 170, and longitudinally-extending members 172, lower radius rods 166 are configured to pivot a maximum distance in a vertical plane (not shown) rearward of frame coupler 178 during operation of vehicle 2 without any interference from lower frame assembly 8.

In addition to supporting lower radius rods 166, frame coupler 178 also couples together upstanding members 170 and longitudinally-extending members 172 of lower frame assembly 8. More particularly, longitudinally-extending members 172 and upstanding members 170 are both coupled to frame coupler 178 which defines a rear corner of rear portion 168 of lower frame assembly 8. Additionally, frame coupler 178 may include apertures 210 (FIG. 25) for receiving fasteners (not shown) to couple with additional components of rear portion 168 of lower frame assembly 8. As such, frame coupler 178 couples together separate frame components (e.g., upstanding members 170 and longitudinally-extending members 172) and a portion of rear suspension assembly 18 (e.g., lower radius rods 166).

In one embodiment, frame coupler 178 may be a singular cast component with an upper portion 198 and a lower portion 200. Upper portion 198 has a semi-circular recess 202 truncated by a ledge 204 which receives the lower ends of upstanding members 170. In one embodiment, upper portion 198 extends in a generally vertical direction. The lower ends of upstanding members 170 are retained within recesses 202 with adhesive, welds, mechanical fasteners, or any other manner of coupling upstanding members 170 to frame coupler 178. As such, upstanding members 170 may be fixed or permanently coupled to frame coupler 178.

Lower portion 200 of frame coupler 178 includes a protrusion 206 extending generally longitudinally and configured to be received within an open rearward end of longitudinally-extending members 172. The rearward ends of longitudinally-extending members 172 are retained on protrusions 206 with adhesive, welds, mechanical fasteners, or any other coupling members. As such, longitudinally-extending members 172 may be fixed or permanently coupled to frame coupler 178, however, lower radius rods 166 are removably coupled to frame coupler 178. In this way, frame coupler 178 may be a single component in which upper portion 198, lower portion 200, and rearward extent 208 are integral with each other that is configured to couple with a plurality of components of vehicle 2, such as upstanding members 170, longitudinally-extending members 172, lower radius rods 166, and support plate 174.

Figure 22:
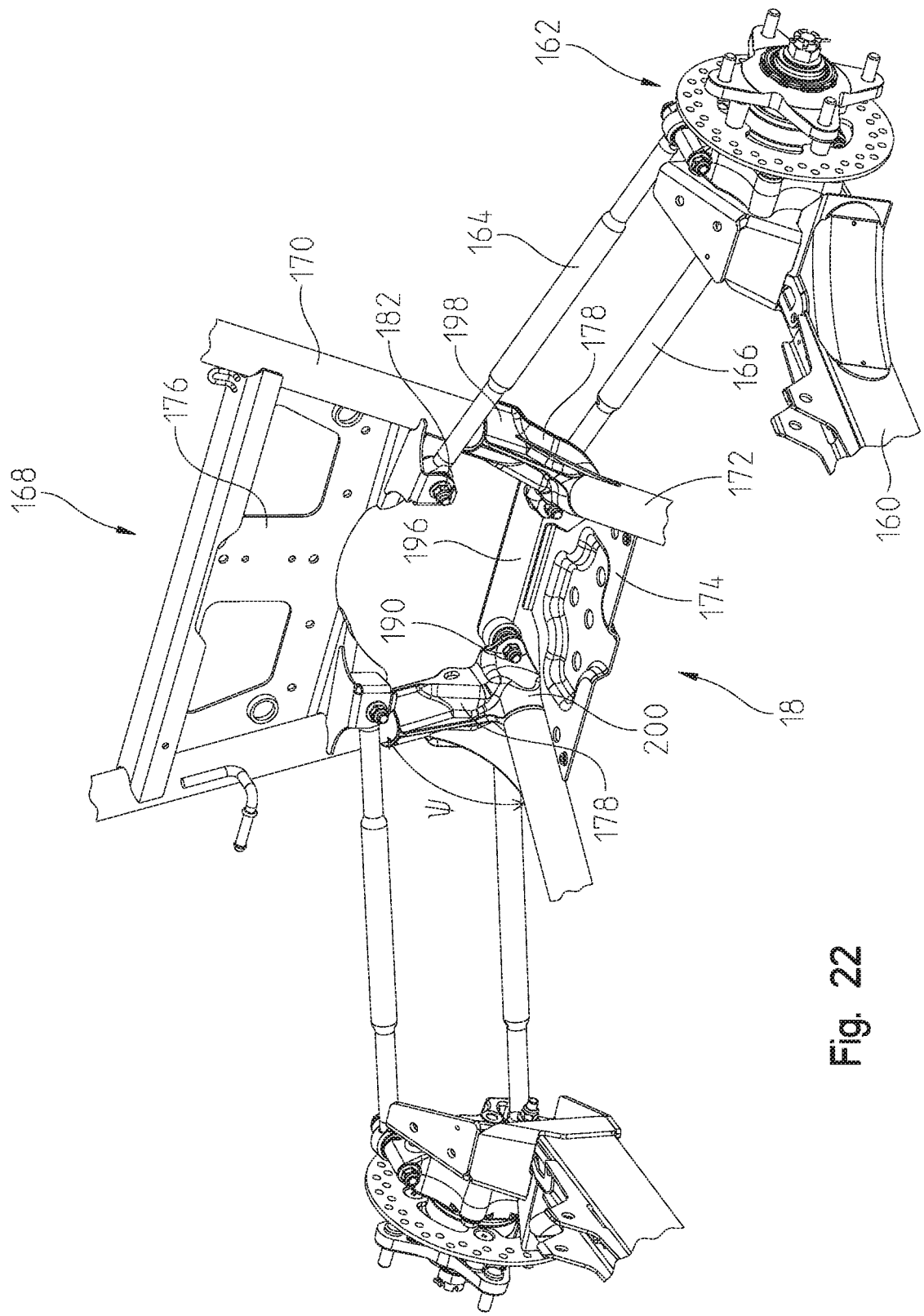
FIG. 22 is a left front perspective view of the rear suspension assembly of FIG. 21.

Additionally, in the illustrative embodiment of vehicle 2, frame coupler 178 is configured to couple with upstanding members 170 and with longitudinally-extending members 172 which are angled relative to each other. For example, longitudinally-extending members 172 are angled away from longitudinal axis L (FIG. 5) and toward trailing arms 160 and upstanding members 170 are angled away from a vertical axis (not shown) intersecting longitudinal axis L. Additionally, frame coupler 178 is configured to couple with lower radius rods 166 which are angled relative to upstanding members 170 and longitudinally-extending members 172. For example, as shown in FIG. 23, radius rods 164, 166 are angled relative to longitudinally-extending members 172 by an angle $\alpha$, which, illustratively, may be less than 90°. Additionally, as shown in FIG. 22, upstanding members 170 is angled relative to longitudinally-extending members 172 by an angle $\Psi$, which, illustratively, may be approximately 75-115°, for example approximately 90°. Also, as shown in FIG. 21, upstanding members 170 are angled relative to lower radius rods 166 by an angle $\beta$, which, illustratively, may be 75-115°, and, in one example, 75-90°. As such, frame coupler 178 is a single component configured to couple with various components of vehicle 2 at a plurality of angles relative to each other.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A vehicle, comprising:
   a plurality of ground-engaging members;
   a frame assembly supported by the plurality of ground-engaging members;

a seating area supported by the frame assembly and configured to support at least an operator and a passenger;
a cargo area positioned rearward of the seating area and including a floor configured to support cargo thereon;
a powertrain assembly including an engine and a transmission operably coupled to at least one of the plurality of ground-engaging members;
a heat exchanger fluidly coupled to the engine, the heat exchanger being angled relative to the floor of the cargo area and positioned along a lateral side of the cargo area; and
an air intake assembly having a first air intake fluidly coupled to the engine and a second air intake fluidly coupled to the transmission, and both the first and second air intakes are positioned along a side of the cargo area.

2. The vehicle of claim 1, further comprising a housing removably coupled to a portion of the cargo area and configured to support the heat exchanger therein; and at least one fan fluidly coupled to the heat exchanger.

3. The vehicle of claim 2, wherein the at least one fan includes a first fan and a second fan, and both the first and second fans are angled relative to the floor of the cargo area.

4. The vehicle of claim 3, wherein the first fan is angled relative to the second fan.

5. The vehicle of claim 1, wherein at least a portion of the air intake assembly is positioned laterally outward of the seating area.

6. The vehicle of claim 1, wherein the air intake assembly is configured to vent air rearwardly from the vehicle.

7. The vehicle of claim 6, further comprising a housing removably coupled to a portion of the cargo area and configured to include the first air intake, the second air intake, and the heat exchanger, and the housing includes a first vent positioned at a forward portion of the housing and a second vent positioned at a rearward portion of the vehicle, and the second vent is configured to expel air rearwardly from the vehicle.

8. The vehicle of claim 7, wherein the housing further includes a third vent positioned longitudinally intermediate the first and second vents, and the first vent is configured to provide air to the engine and the transmission and the third vent is configured to provide air to the heat exchanger.

9. A vehicle, comprising:
a plurality of ground-engaging members including at least one front ground-engaging member and at least one rear ground-engaging member;
a frame assembly supported by the plurality of ground-engaging members and extending between a forward frame portion and a rearward frame portion along a longitudinal axis;
a cargo area supported on the rearward frame portion of the frame assembly;
a powertrain assembly supported on the rearward frame portion of the frame assembly and including an engine and a transmission operably coupled to at least one of the front and rear ground-engaging members;
a heat exchanger fluidly coupled to the engine and positioned above the at least one rear ground-engaging member; and
a housing configured to include the heat exchanger, a first air intake fluidly coupled to the engine, and a second air intake fluidly coupled to the transmission, and the housing is positioned above the at least one rear ground-engaging member.

10. The vehicle of claim 9, wherein the cargo area extends laterally between a first lateral side and a second lateral side and includes a generally continuous floor portion extending between the first and second lateral sides and configured to receive cargo thereon, and the heat exchanger and the first and second air intakes are laterally spaced apart from the generally continuous floor portion.

11. The vehicle of claim 9, further comprising a seating area supported by the frame assembly, and at least a portion of the housing is positioned laterally outward of the seating area.

12. The vehicle of claim 9, wherein the housing is removably coupled to a portion of the cargo area, and the housing includes a first vent configured to receive air into the housing and a second vent configured to expel air from the housing, and the second vent is configured to expel air in a rearward direction from the housing.

13. The vehicle of claim 9, wherein the heat exchanger is angled relative to the longitudinal axis.

14. A vehicle, comprising:
a plurality of ground-engaging members;
a frame assembly supported by the plurality of ground-engaging members and extending along a longitudinal axis;
a seating area supported by the frame assembly and configured to support an operator and at least one passenger;
a cargo area supported on the frame assembly and positioned rearward of the seating area;
a powertrain assembly supported on a rearward frame portion of the frame assembly and including an engine and a transmission operably coupled to at least one of the plurality of ground-engaging members; and
an air intake assembly fluidly coupled to the engine and the transmission and positioned rearward of at least a portion of the seating area, and the air intake assembly comprises:
a housing;
a first air intake fluidly coupled to the engine and positioned within the housing; and
a second air intake fluidly coupled to the transmission and positioned within the housing.

15. The vehicle of claim 14, wherein the housing is removably coupled to a portion of the cargo area.

16. The vehicle of claim 14, wherein at least a portion of the housing is positioned laterally outward of the seating area.

17. The vehicle of claim 14, wherein the housing includes a wall separating the first air intake and the second air intake.

18. The vehicle of claim 14, wherein the air intake assembly further comprises a heat exchanger supported within the housing, and the first and second air intakes are positioned forward of the heat exchanger.

19. The vehicle of claim 18, wherein the heat exchanger is angled relative to the longitudinal axis and is angled relative to a vertical axis perpendicular to the longitudinal axis.

20. The vehicle of claim 19, wherein the air intake assembly further comprises at least one fan angled fluidly coupled to the heat exchanger and angled relative to the longitudinal axis.

21. The vehicle of claim 20, wherein the at least one fan includes a first fan and a second fan, and the first fan is angled relative to the second fan.

22. The vehicle of claim 19, wherein housing includes a first vent fluidly coupled to at least one of the engine and the transmission and a second vent fluidly coupled to the heat exchanger.

23. The vehicle of claim 22, wherein the housing further includes a third vent configured to expel air rearwardly from the housing.

24. A vehicle, comprising:
a plurality of ground-engaging members;
a frame assembly supported by the plurality of ground-engaging members;
a seating area supported by the frame assembly and configured to support at least an operator and a passenger;
a cargo area positioned rearward of the seating area and including a floor configured to support cargo thereon;
a powertrain assembly including an engine and a transmission operably coupled to at least one of the plurality of ground-engaging members;
a heat exchanger fluidly coupled to the engine, the heat exchanger being angled relative to the floor of the cargo area and positioned along a lateral side of the cargo area; and
an air intake assembly having a first air intake fluidly coupled to the engine and a second air intake fluidly coupled to the transmission, and both the first and second air intakes are positioned along a side of the cargo area.

25. A vehicle, comprising:
a plurality of ground-engaging members including at least one front ground-engaging member and at least one rear ground-engaging member;
a frame assembly supported by the plurality of ground-engaging members and extending between a forward frame portion and a rearward frame portion along a longitudinal axis;
a cargo area supported on the rearward frame portion of the frame assembly;
a powertrain assembly supported on the rearward frame portion of the frame assembly and including an engine and a transmission operably coupled to at least one of the front and rear ground-engaging members;
a heat exchanger fluidly coupled to the engine and positioned above the at least one rear ground-engaging member; and
a housing configured to include the heat exchanger, a first air intake fluidly coupled to the engine, and a second air intake fluidly coupled to the transmission, and the housing is positioned above the at least one rear ground-engaging member.

26. The vehicle of claim 25, wherein the cargo area extends laterally between a first lateral side and a second lateral side and includes a generally continuous floor portion extending between the first and second lateral sides and configured to receive cargo thereon, and the heat exchanger and the first and second air intakes are laterally spaced apart from the generally continuous floor portion.

27. The vehicle of claim 25, further comprising a seating area supported by the frame assembly, and at least a portion of the housing is positioned laterally outward of the seating area.

28. A vehicle, comprising:
a plurality of ground-engaging members;
a frame assembly supported by the plurality of ground-engaging members and extending along a longitudinal axis;
a seating area supported by the frame assembly and configured to support an operator and at least one passenger;
a cargo area supported on the frame assembly and positioned rearward of the seating area;
a powertrain assembly supported on a rearward frame portion of the frame assembly and including an engine and a transmission operably coupled to at least one of the plurality of ground-engaging members; and
an air intake assembly fluidly coupled to the engine and the transmission and positioned rearward of at least a portion of the seating area, and the air intake assembly comprises:
a housing;
a first air intake fluidly coupled to the engine and positioned within the housing;
a second air intake fluidly coupled to the transmission and positioned within the housing; and
a heat exchanger supported within the housing, and the first and second air intakes are positioned forward of the heat exchanger.

* * * * *